US009378467B1

(12) United States Patent
Chaiyochlarb et al.

(10) Patent No.: US 9,378,467 B1
(45) Date of Patent: Jun. 28, 2016

(54) USER INTERACTION PATTERN EXTRACTION FOR DEVICE PERSONALIZATION

(71) Applicant: Microsoft Technology Licensing, LLC, Redmond, WA (US)

(72) Inventors: Chan Chaiyochlarb, Redmond, WA (US); Lin Jiang, Redmond, WA (US); Susan Chory, Seattle, WA (US); Shriram Nanjundaiah, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/596,881

(22) Filed: Jan. 14, 2015

(51) Int. Cl.
| G06F 17/00 | (2006.01) |
| G06F 17/20 | (2006.01) |
| G06N 99/00 | (2010.01) |
| G06N 5/04 | (2006.01) |

(52) U.S. Cl.
CPC .............. *G06N 99/005* (2013.01); *G06N 5/047* (2013.01)

(58) Field of Classification Search
None
See application file for complete search history.

(56) References Cited

U.S. PATENT DOCUMENTS

| 7,184,939 | B1 | 2/2007 | Trowbridge et al. | |
| 7,725,419 | B2 | 5/2010 | Lee et al. | |
| 8,024,444 | B2* | 9/2011 | Parikh ...................... | G06F 15/16 709/223 |
| 8,176,342 | B2* | 5/2012 | Vaidyanathan ..... | G06F 11/3466 713/300 |
| 8,249,824 | B2* | 8/2012 | Haag ....................... | G06F 13/00 702/179 |
| 8,607,305 | B2* | 12/2013 | Neystadt ................. | G06F 21/64 379/106.01 |
| 8,660,673 | B2* | 2/2014 | Short ...................... | A63F 13/10 463/42 |
| 8,688,726 | B2* | 4/2014 | Mahajan .............. | G06F 17/3087 455/456.1 |
| 8,701,042 | B2 | 4/2014 | Kirkham et al. | |
| 8,711,700 | B2* | 4/2014 | Chen ....................... | H04L 43/18 370/236 |

(Continued)

FOREIGN PATENT DOCUMENTS

| CA | 2802369 A1 | 7/2013 |
| JP | 06175813 A | 6/1994 |

OTHER PUBLICATIONS

Using trajectory features for upper limb action recognition Xiaoting Wang; Sofia Suvorova; Tamilkavitha Vaithianathan; Christopher Leckie Intelligent Sensors, Sensor Networks and Information Processing (ISSNIP), 2014 IEEE Ninth International Conference on Year: 2014 pp. 1-6, DOI: 10.1109/ISSNIP.2014.6827613 IEEE Conference Publications.*

(Continued)

*Primary Examiner* — Michael B Holmes
(74) *Attorney, Agent, or Firm* — Bryan Webster; Judy Yee; Micky Minhas

(57) ABSTRACT

A context-aware personalization system operable with a device such as a smartphone, tablet, personal computer (PC), game console, etc. extracts user interaction patterns from a graph, which is generated using telemetry data points, of a device user's behaviors and interactions. The telemetry data is mined from instrumented applications, operating system, and other components executing on the device. A machine learning pattern recognition algorithm is applied to the behavior and interaction graph to generate a dataset that can include a prioritized list of activities. The list is used to automatically implement personalization of the local device that are tailored to the user while also enabling background agents and processes associated with lower priority applications to be suspended to preserve device resources such as processor cycles, memory, battery power, etc. and increase device performance.

20 Claims, 18 Drawing Sheets

(56) References Cited

U.S. PATENT DOCUMENTS

| | | | | |
|---|---|---|---|---|
| 8,774,212 | B2* | 7/2014 | Blackburn | H04L 43/024 370/449 |
| 8,990,634 | B2* | 3/2015 | Sadovsky | G06F 11/0778 714/25 |
| 9,009,738 | B2* | 4/2015 | Matichuk | H04L 41/0809 709/224 |
| 9,105,178 | B2* | 8/2015 | Carlson | G08C 19/00 |
| 9,172,652 | B2* | 10/2015 | Chen | H04L 43/18 |
| 9,223,845 | B2* | 12/2015 | Horn | G06F 3/0688 |
| 2003/0030666 | A1 | 2/2003 | Najmi et al. | |
| 2007/0083827 | A1 | 4/2007 | Scott et al. | |
| 2011/0072492 | A1 | 3/2011 | Mohler et al. | |
| 2011/0320957 | A1 | 12/2011 | Tiddens | |
| 2013/0086481 | A1 | 4/2013 | Balasaygun et al. | |
| 2013/0311946 | A1 | 11/2013 | Kwon | |
| 2013/0339901 | A1 | 12/2013 | Kirkham et al. | |
| 2014/0053189 | A1 | 2/2014 | Lee et al. | |
| 2014/0108978 | A1 | 4/2014 | Yu et al. | |
| 2014/0188956 | A1 | 7/2014 | Subba et al. | |
| 2014/0195972 | A1 | 7/2014 | Lee et al. | |

OTHER PUBLICATIONS

A pacemaker working status telemonitoring algorithm Jing Bai; Jianwu Lin IEEE Transactions on Information Technology in Biomedicine Year: 1999, vol. 3, Issue: 3 pp. 197-204, DOI: 10.1109/4233.788581 IEEE Journals & Magazines.*

Smartphone-compatible robust classification algorithm for the Tongue Drive System Abner Ayala-Acevedo; Maysam Ghovanloo Biomedical Circuits and Systems Conference (BioCAS), 2014 IEEE Year: 2014 pp. 161-164, DOI: 10.1109/BioCAS.2014.6981670 IEEE Conference Publications.*

Personalization Algorithm for Real-Time Activity Recognition Using PDA, Wireless Motion Bands, and Binary Decision Tree Juha Pärkkä; Luc Cluitmans; Miikka Ermes IEEE Transactions on Information Technology in Biomedicine Year: 2010, vol. 14, Issue: 5 pp. 1211-1215, DOI: 10.1109/TITB.2010.2055060 IEEE Journals & Magazines.*

Bohmer, et al., "A Study on Icon Arrangement by Smartphone Users", In Proceedings of the SIGCHI Conference on Human Factors in Computing Systems, Apr. 27, 2013, pp. 2137-2146. (10 pages total).

Bohmer, et al., "Exploiting the Icon Arrangement on Mobile Devices as Information Source for Context-awareness", In Proceedings of the 12th International Conference on Human Computer Interaction with Mobile Devices and Services, Sep. 7, 2010, pp. 195-198 (4 pages total).

Perez, Sarah, "The Five Ways Users Organize Their Apps and What App Designers Can Learn From This", Published on: Feb. 10, 2013, Available at: http://techcrunch.com/2013/02/10/the-five-ways-users-organize-their-apps-and-what-app-designers-can-learn-from-this/ Retrieved on Jan. 8, 2014 (9 pages total).

International Search Report and Written Opinion Issued in PCT Application No. PCT/US2015/067975, Mailed Date: Mar. 18, 2016, 15 Pages.

* cited by examiner

USER INTERACTION PATTERN EXTRACTION FOR DEVICE PERSONALIZATION

BACKGROUND

Individual users have different ways of displaying and interacting with applications on their devices, and their interaction models can be dynamic. Although many existing devices allow customization by users to fit their personal needs, such customization is often static. Thus, users typically face the need to constantly adjust the device configuration in order to keep pace with changing needs.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A context-aware personalization system operable with a device such as a smartphone, tablet, personal computer (PC), game console, etc. extracts user interaction patterns from a graph, which is generated using telemetry data points, of a device user's behaviors and interactions. The telemetry data is mined from instrumented applications, operating system, and other components executing on the device. A machine learning pattern recognition algorithm is applied to the behavior and interaction graph to generate a dataset that can include a prioritized list of activities. The list is used to automatically implement personalization of the local device and optimization of personal experiences that are tailored to the user while also enabling background agents and processes associated with lower priority applications to be suspended to preserve device resources such as processor cycles, memory, battery power, etc. and increase device performance.

In illustrative examples, the personalization includes composing and rendering a start screen on the device's user interface (UI) and placing customized notifications in the UI's lock screen that reflect the prioritized list. The personalization can be implemented in view of context such as a day/time, device type and location, and other factors so that the start and lock screens provide information and experiences having contextual relevance. The user's interactions with the personalized controls and objects on the UI may themselves be mined as telemetry data and used as part of a virtuous loop with the pattern-recognition algorithm that may facilitate machine learning in some cases.

The personalization system may also be operated with, or in some cases be incorporated into, a digital assistant that is operable on the device. The digital assistant typically interacts with the user using voice conversations and can provide a variety of services and perform different tasks. The digital assistant may be adapted to mine telemetry data and/or use the interaction pattern dataset, context, and other information, for example, when performing tasks, providing services, making suggestions, etc. that are appropriate and contextually relevant to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

Figure 1:
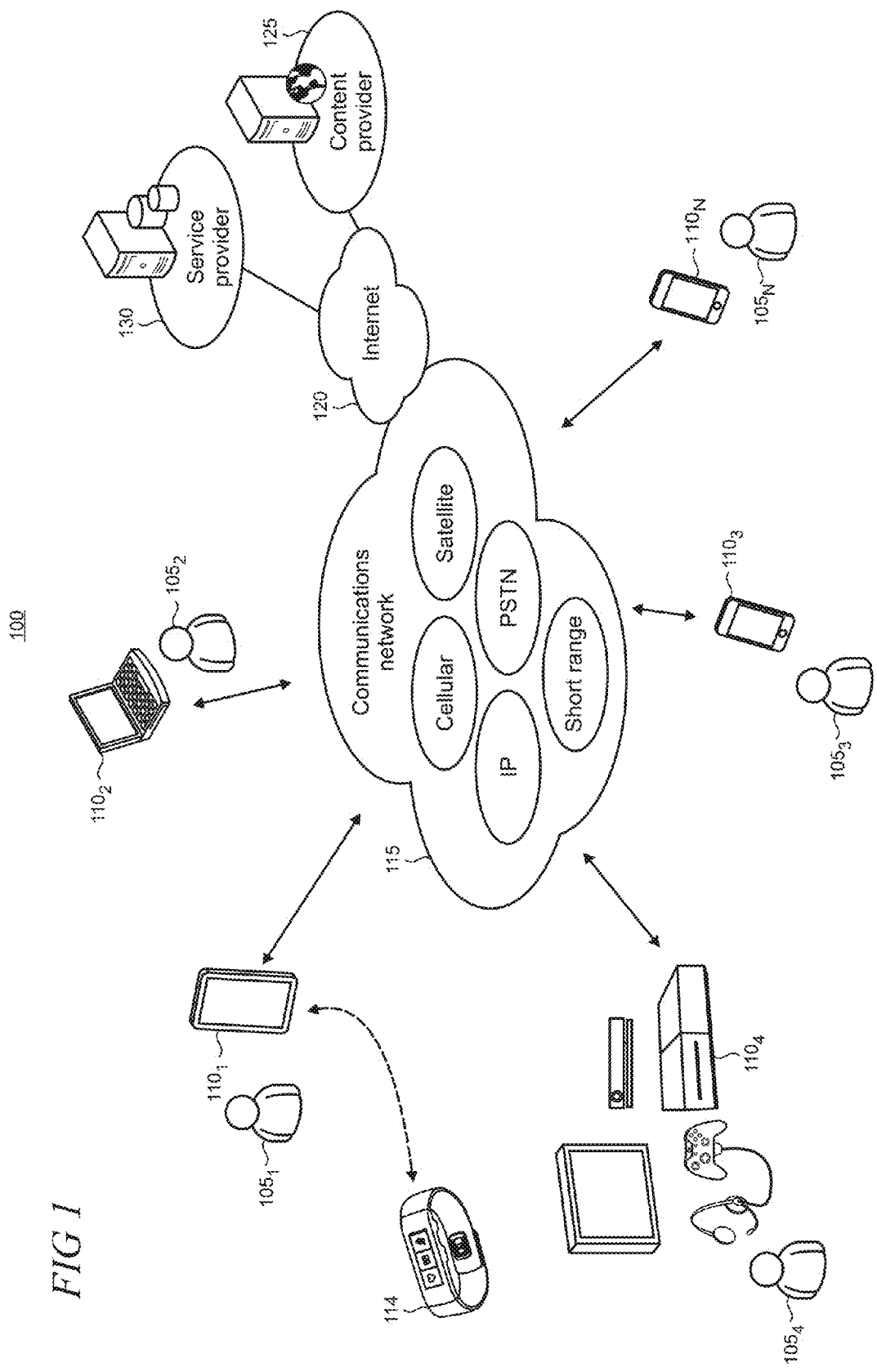
FIG. 1 shows an illustrative computing environment in which devices can communicate and interact over a network.

Like reference numerals indicate like elements in the drawings. Elements are not drawn to scale unless otherwise indicated. It is emphasized that the particular UIs displayed in the drawings can vary from what is shown according to the needs of a particular implementation. While UIs are shown in portrait mode in the drawings, the present arrangement may also be implemented using a landscape mode.

DETAILED DESCRIPTION

FIG. 1 shows an illustrative environment 100 in which various users 105 employ respective devices 110 that communicate over the communications network 115. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth® networks. The network infrastructure can be supported, for example, by mobile operators, enterprises, Internet service providers (ISPs), telephone service providers, data service providers, and the like. The communications network 115 typically includes interfaces that support a connection to the Internet 120 so that the mobile devices 110 can access content provided by one or more content providers 125 and also access a service provider 130 in some cases. Accordingly, the communications network 115 is typically enabled to support various types of device-to-device communications including over-the-top communications, and communications that do not utilize conventional telephone numbers in order to provide connectivity between parties.

Accessory devices 114, such as wristbands and other wearable devices may also be present in the environment 100. Such accessory device 114 typically is adapted to interoperate with a device 110 using a short range communication protocol like Bluetooth to support functions such as monitoring of the wearer's physiology (e.g., heart rate, steps taken, calories burned, etc., referred to as "biometric data") and environmental conditions (temperature, humidity, ultra-violet (UV) levels, etc., referred to as "environmental data"), and surfacing notifications from the coupled device 110.

Figure 2:
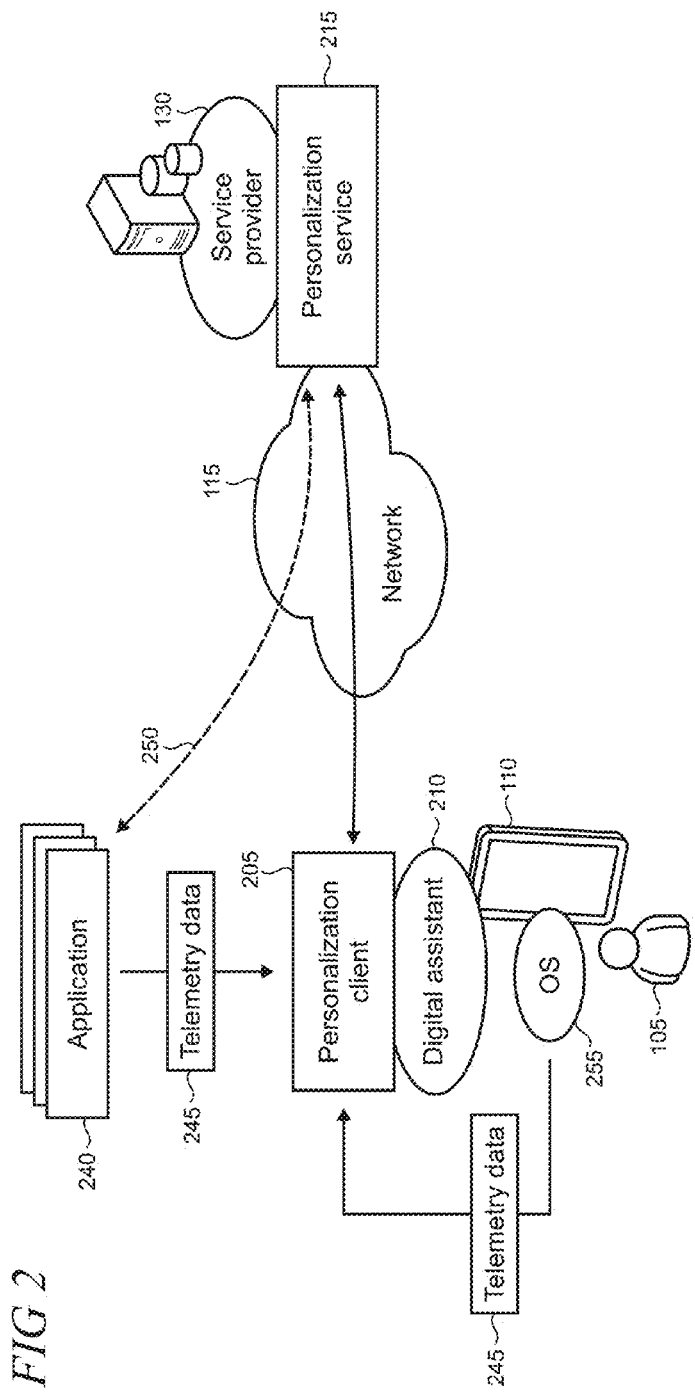
FIG. 2 shows illustrative interactions involving a digital assistant that is operable on a device.
Figure 3:
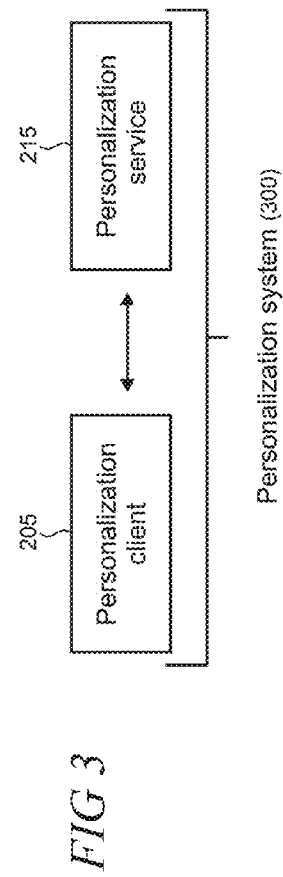
FIG. 3 shows an illustrative personalization system that includes a client and service.

FIG. 2 shows an overview of a personalization arrangement in which a device 110 hosts a personalization client 205 that can be operated on a standalone basis or in conjunction with a digital assistant 210 in some cases, as described in more detail below. The personalization client 205 typically interoperates over the communications network 115 with a personalization service 215 supported by the remote service provider 130. As shown in FIG. 3, the client 205 and service 215 form a personalization system 300 that is configured for extracting patterns of user interaction with the device and providing personalized experiences.

In typical implementations, a mix of local and remote code execution is utilized at the respective client and service. However, in some scenarios such as those in which a connection to remote services is limited or unavailable, local code execution may be utilized substantially on its own to perform the extraction and provision of device personalization. The particular distribution of local and remote processing may often be a design choice that is made in consideration of various applicable requirements for allocation of resources such as processing capabilities, memory, network bandwidth, power, etc. In some implementations, a device may be configured to support a dynamic distribution of local and remote processing in order to provide additional optimization of resource allocation and user experiences.

Referring again to FIG. 2, the personalization client 205 is configured to enable interaction with one or more applications 240 available to the device 110 in order that telemetry data 245 can be mined and utilized to extract user interaction patterns. The applications 240 can be third party applications in some cases in which the application authors, developers, or providers are entities that are not the same as the provider of the personalization system and/or device operating system (OS), for example. First party applications can also be supported in some implementations of the present user interaction pattern extraction for device personalization. The personalization service 215 may also support direct interaction with the applications 240, as indicated by line 250. Telemetry data may also be mined using the operating system 255 in some cases. In typical implementations, the data mining is performed on an anonymized basis with notice to the user (i.e., as to why the data is being collected and the benefits provided by the personalization system) and with the user's consent.

Figure 5:
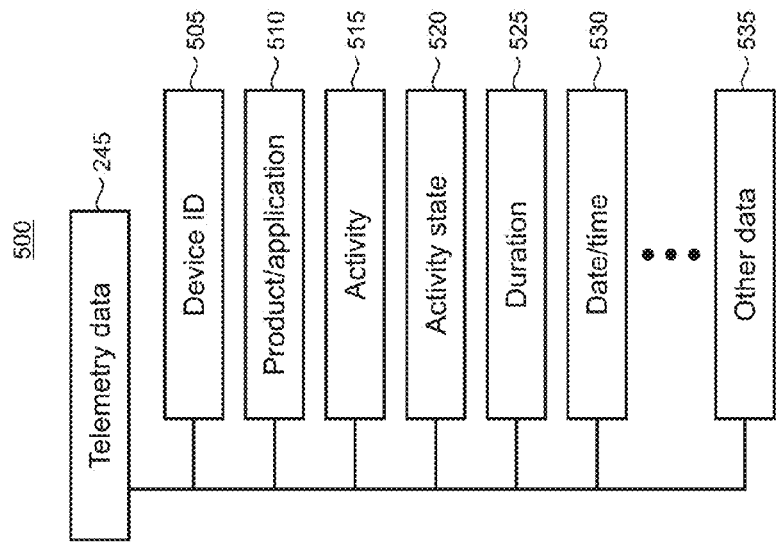
FIG. 5 shows an illustrative schema of telemetry data types.
Figure 4:
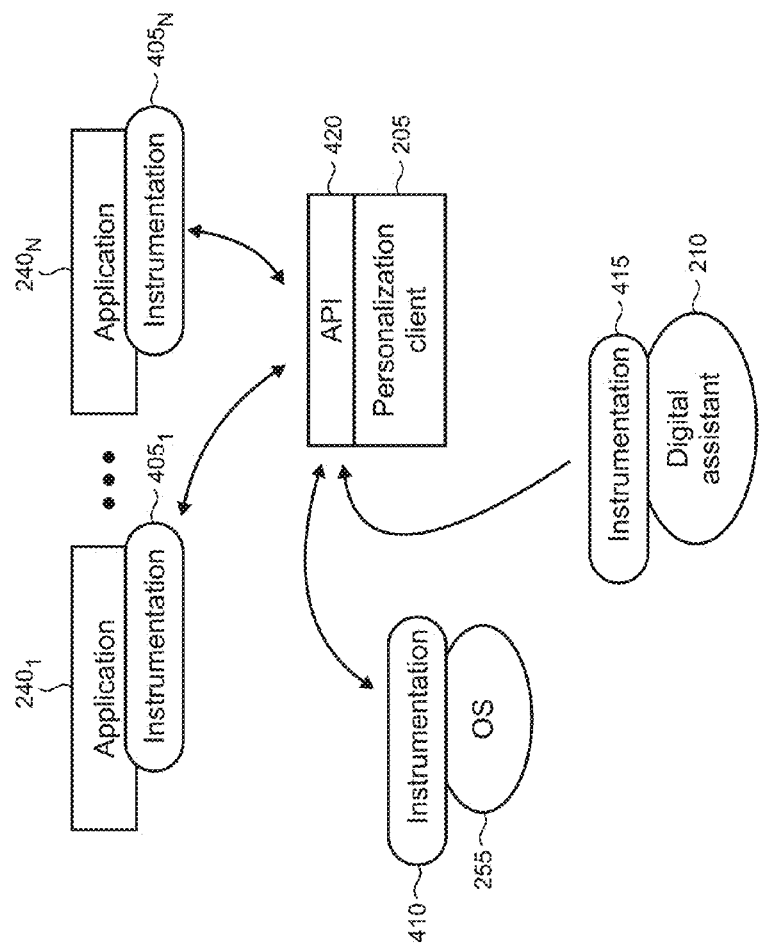
FIG. 4 shows an illustrative arrangement in which applications and an operating system are instrumented for interaction with an application programming interface exposed by the personalization client.

As shown in FIG. 4, applications 240, OS 255, and the digital assistant 210 on a given device are instrumented as respectively indicated by reference numerals 405, 410, and 415. The instrumentation enables interactions through an API 420 that is exposed by the personalization client 205 to effectuate the telemetry data mining. The particular telemetry data mined can vary by implementation and application. As shown in the schema 500 in FIG. 5, the telemetry data 245 can include and/or identify a device ID 505; product/application 510; activity 515; activity state 520 (e.g., start and end of an activity); activity duration 525; date/time 530; and other data 535 to meet the needs of a particular implementation. It is emphasized that the particular telemetry data types shown in FIG. 5 are intended to be illustrative and not exhaustive. It is further emphasized that the telemetry data can describe events that are associated with user interactions with an application as well as events resulting from an application's own processing and logic. Accordingly, the personalization system can be configured, in some scenarios, to use the telemetry data to compare and contrast native application behaviors with the user's behavior patterns.

Figure 6:
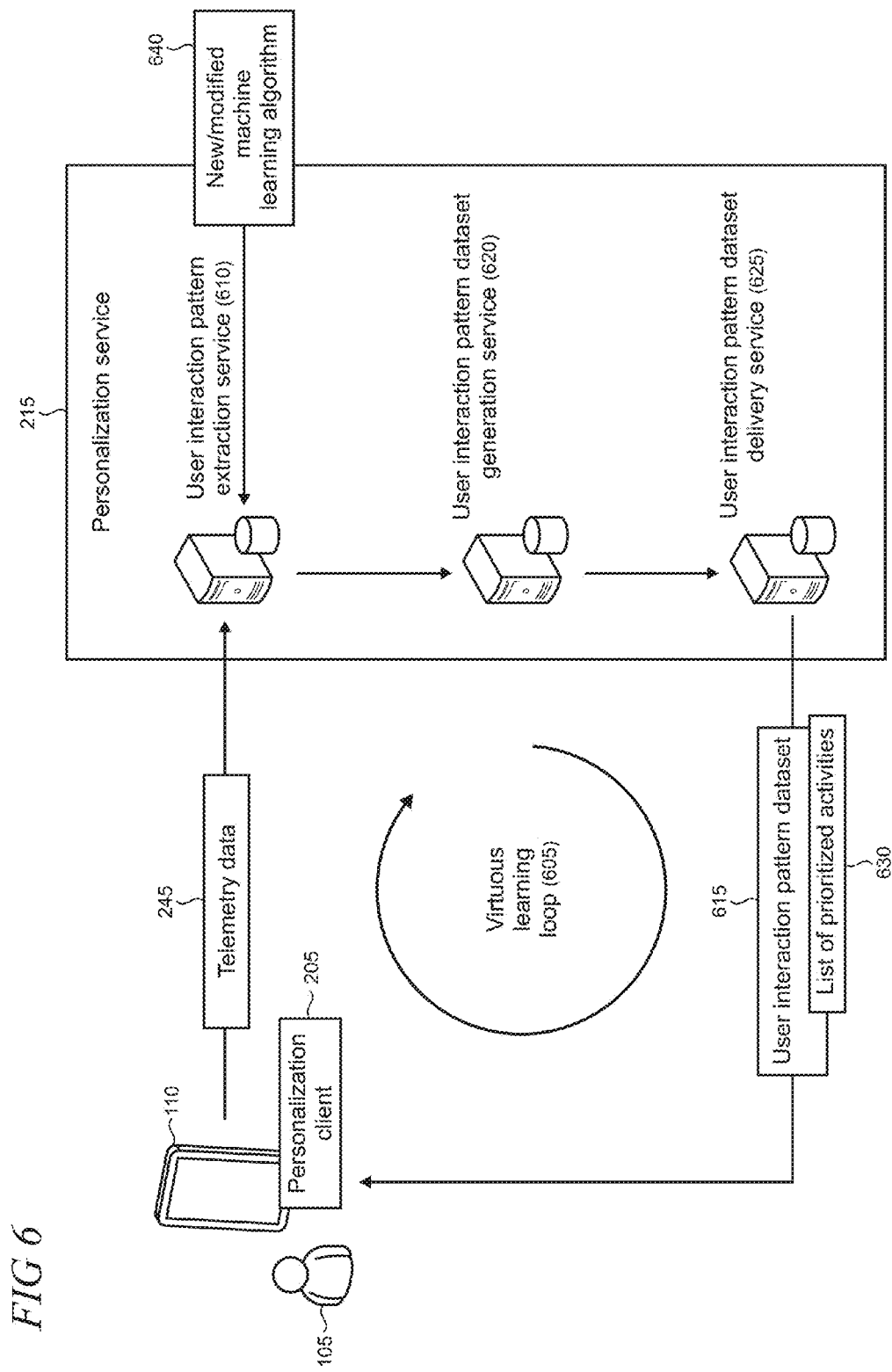
FIG. 6 shows the application of a machine learning algorithm to telemetry data in a closed loop configuration.

As shown in FIG. 6, the telemetry data 245 that is mined locally on the device 110 is handled by the personalization system 300 using various component services as part of a virtuous learning loop 605. The mining can be performed substantially continuously or on a periodic basis. The telemetry data 245 may be stored locally on the device 110 and utilized locally (e.g., in situations in which local user interaction pattern extraction and device personalization are implemented) and/or transmitted to the remote service 215 over the network 115 (FIG. 1).

A user interaction pattern extraction service 610 applies the machine learning pattern recognition algorithm to the telemetry data to determine statistical measures of outcomes as correlative trends, using for example, a clustering algorithm or probabilistic naïve Bayes classifier. A user interaction pattern dataset 615 is generated from the extracted user interaction pattern and delivered to the local device 110 using a generation service 620 and delivery service 625, respectively.

The dataset 615 typically includes a list of prioritized activities 630 that the local personalization client 205 may utilize to automatically implement device personalization for the user 105. For example, the start and lock screens displayed on a device UI may be personalized to control the size and/or placement of objects such as application launch controls and notifications that reflect the prioritized activities (examples of which are provided below in the text accompanying FIGS. 8, 9, 11, and 12). In alternative implementations, the service 215 can be configured to provide the personalization with comparatively little or no processing by the local client. The list 630 can also be utilized to allocate device resources by suspending, slowing, or discontinuing operation of lower priority activities, background processes, applications, and the like. For users who install a typical number of applications, there is a reasonable likelihood that some applications are unnecessarily consuming valuable resources even if they are not actively used.

The virtuous learning loop 605 may be implemented as a dynamic process. For example, the user's interaction with the applications, OS, and personalized objects such as application launch controls and notifications can be mined as part of the telemetry data and fed back to the service 215. Such feedback can be used to enable additional refinement of the user interaction pattern dataset 615 and list 630 for optimizing device personalization and experiences for the user. New or modified algorithms 640 can also be introduced into the system to provide additional refinement and optimization in some cases.

Figure 7:
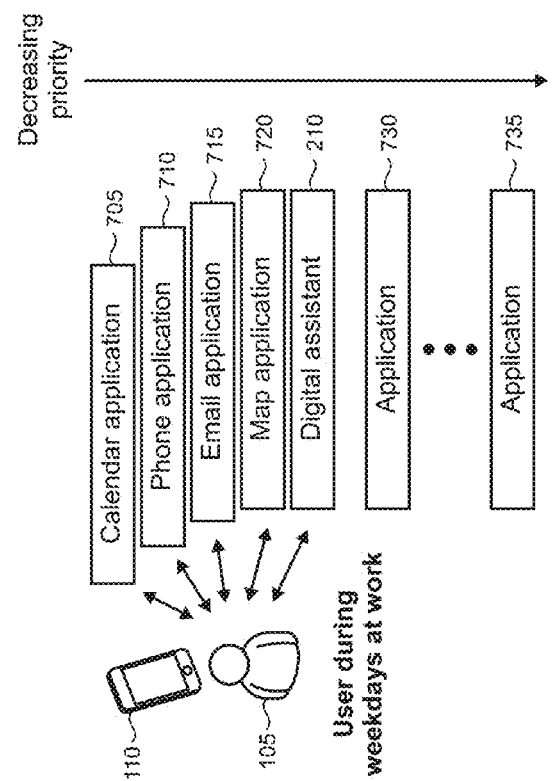
FIG. 7 shows an illustrative use scenario in which a user interacts with various applications on a device during the work day.

FIG. 7 shows an illustrative use scenario in which a user 105 interacts with various applications on a device 110 during the work day. In this example, while working, the user regularly interacts with her calendar application 705, phone application 710, email application 715, and map application 720, as well as the digital assistant 210. Other applications 730 and 735 installed on the user's device get comparatively little or no use during work. The telemetry data collected from the instrumentation in the applications enables the personalization system to analyze activities associated with the respective applications in order to extract the user's interaction pattern, generate the prioritized activity list, and correlate the pattern to day and time using the date/time stamp.

Figure 8:
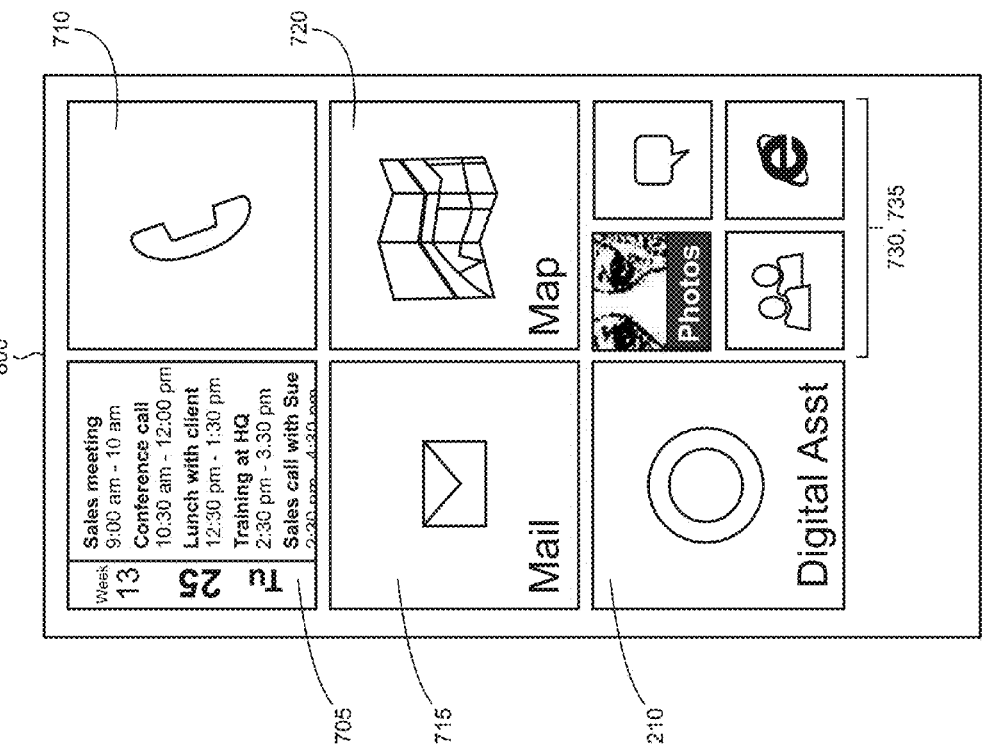
FIGS. 8, 9, 11, and 12 show screen captures of illustrative user interfaces (UIs) exposed on a device display.

The personalization system can employ the user interaction pattern dataset to tailor device personalization and user experiences on the device. As shown in FIG. 8, during work day hours, the device UI 800 can be configured to show application launch controls on a start screen that are made more prominent for higher priority applications and less prominent for lower priority ones. In this example, the launch controls are implemented using touch-sensitive icons (e.g., tiles) that have a larger size for the calendar, phone, map, and digital assistant applications, while the icons for the lower priority applications are smaller. In addition to sizing the icons differently for applications having different priority, the display order of the icons can reflect priority as well. So, for example, as shown the most frequently used calendar and phone application icons 705 and 710 are positioned in the top row of the UI 800.

Figure 9:
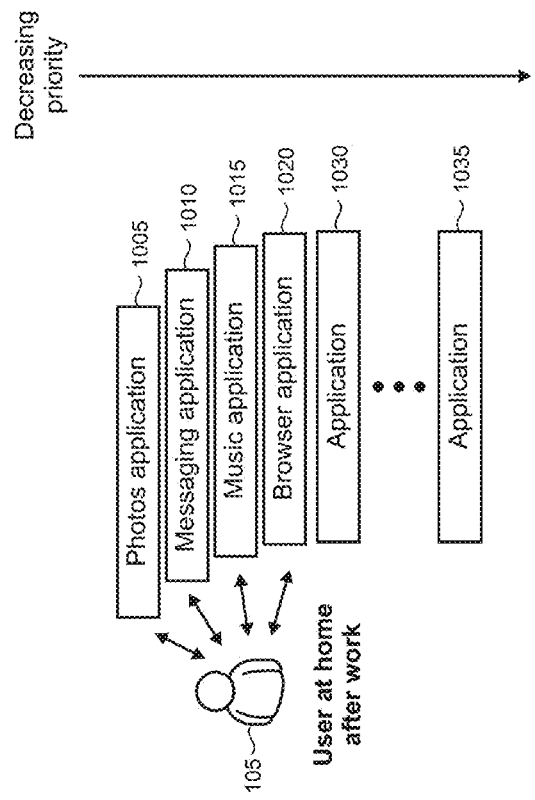

FIG. 9 shows a UI 900 on the device that displays a personalized lock screen. Lock screens are commonly utilized on devices as a way to control access features and functions and lessen the chance for inadvertent inputs to touch screen controls and unintended access. The user can often use a gesture, or some other control manipulation to move from the lock screen to the start screen. In some cases, a password is used to unlock the device. Lock screens typically do not show application icons and instead provide basic information such as date and time, application notifications, device status such as network access and battery state (when applicable), and the like.

As shown, the personalized lock screen shows the user what's happening with her higher priority applications at a glance. In this example, the user's next appointment 910 from the calendar application is shown in an area on the UI under the time and date display. A live, dynamically updated map 915 showing the user's location is displayed towards the top of the UI. Notifications 920 from the frequently used, higher priority phone and email applications are shown at the bottom of the UI to respectively indicate, for example, new voice mail and email messages.

Figure 10:
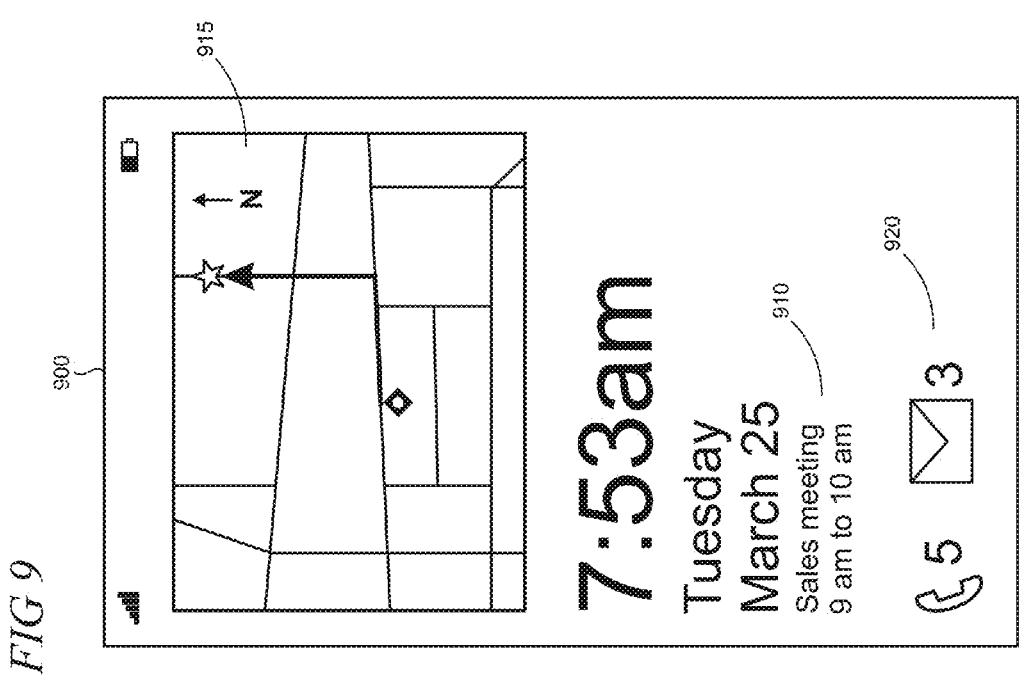
FIG. 10 shows another illustrative use scenario in which a user interacts with various applications on a device after work.

FIG. 10 shows another illustrative use scenario in which the user 105 interacts with various applications on a device 110 after work at home. In this example, after work the user regularly interacts with her photos application 1005, instant messaging application 1010, music application 1015, and web browser application 1020. Other applications 1030 and 1035 get comparatively little use by the user 105 after work. As with the example shown in FIG. 7, telemetry data collected from the instrumentation in the applications enables the personalization system to analyze activities associated with the respective applications in order to extract the user's interaction pattern, generate the prioritized activity list, and correlate the pattern to day and time using the date/time stamp.

Figure 11:
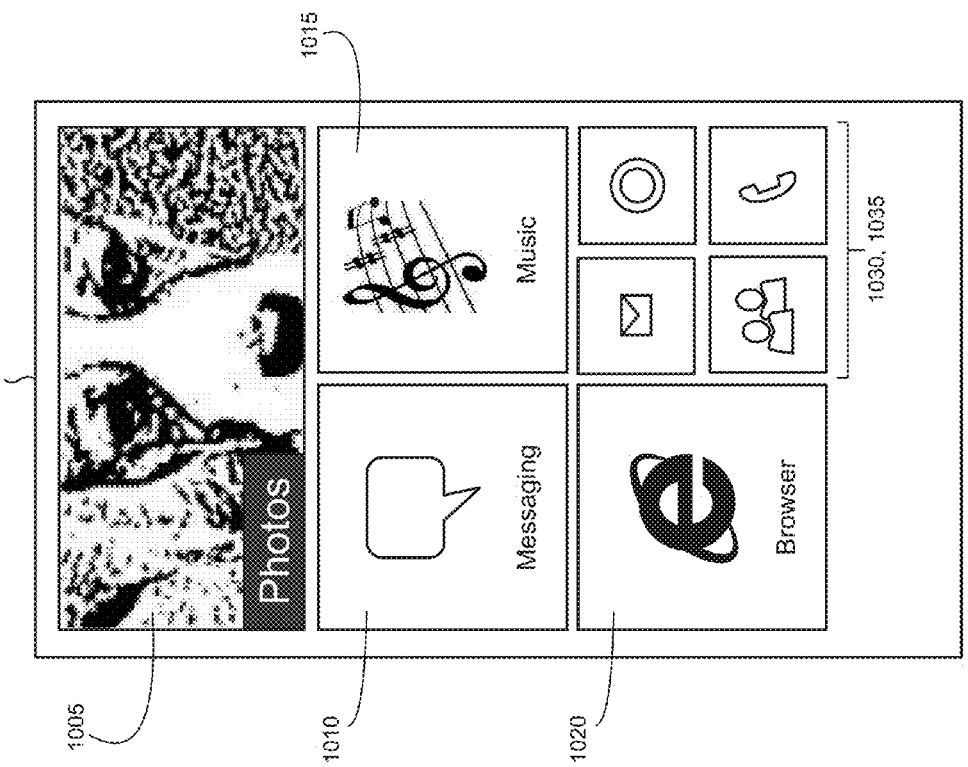

As shown in FIG. 11, the personalization system can employ the user interaction pattern dataset to tailor device personalization and user experiences using a customized UI 1100 for the start screen. After work, the device UI 1100 is configured to show larger size icons for the photo, messaging, music, and browser applications, while making icons for the lower priority applications smaller. In addition, the most frequently used photo application icon 1005 is positioned in the top row of the UI 1100.

Figure 12:
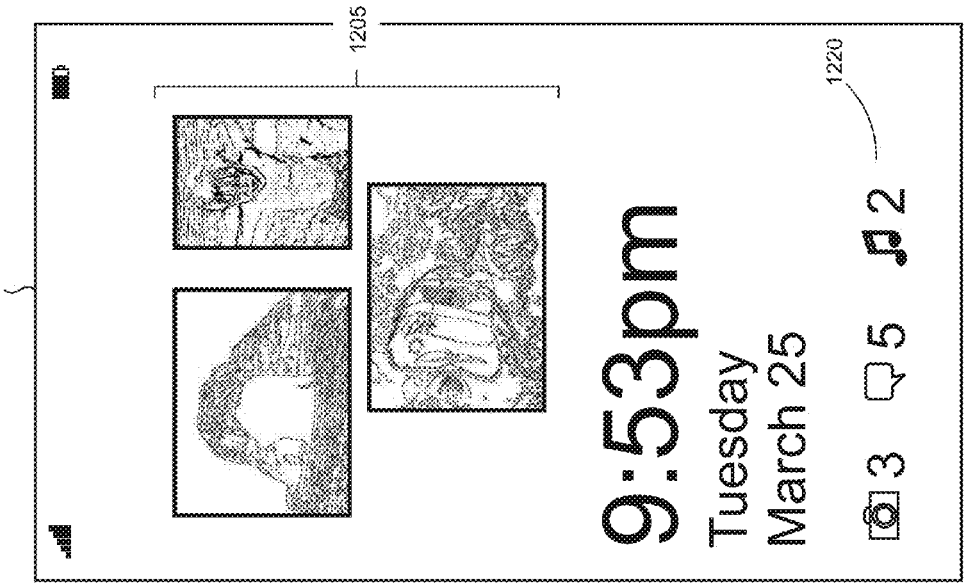

FIG. 12 shows a UI 1200 on the device that displays a personalized lock screen for the user during after work hours. In this example, thumbnails 1205 of three new photos shared by the user's friends through the photo application 1005 are displayed in the top portion of the UI. Notifications 1220 from the frequently used, higher priority photo, messaging, and music applications are shown at the bottom of the UI to indicate, for example, the new shared photos, new instant messages, and new shared songs.

User interaction patterns can not only be correlated to day and time, but also correlated with various contextual data. Contextual data can include, for example, the user's location, language, schedule, the user's preferences, presence/absence of others (e.g., colleagues, friends/family, etc.), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, access network utilization (e.g., whether using a home network or roaming/visited network), SIM (Subscriber Identification Module) utilization (e.g., when multiple SIMs are supported on a given device), data associated with other parties to a communication (e.g., their schedules, preferences, etc.), and the like.

Different types of contextual data can be used in various combinations and not all types need to be used in every implementation. In illustrative examples, correlations of user interaction patterns to contextual data can enable the personalization system to identify one-off and/or special events such as holidays, weddings, births, vacations, emergencies, etc., that are not part of the user's typical usage patterns. For recurring events, like birthdays and holidays, the system can provide device personalization and user experiences for the next occurrence. The personalization system can also identify behavior and interaction patterns to differentiate device and experience personalization for different aspects of the user's life like work and personal life. For example, the system can identify that the user has different phone interactions with a SIM (e.g., in a dual SIM device) that is used for work as compared with the other SIM that is used for personal calls. Such identification enables the personalization system to tailor the device and surface experiences that are appropriate and helpful for each of the different contexts, whether work or personal, in this example.

There may also be employer policy, cost, mobile phone subscription terms, network utilization (e.g., roaming or home network), and other factors/data that may be considered in some scenarios when personalizing the device or user experiences. For example, the system may suggest to the user that an international call be made with a work SIM/mobile phone plan when calling a colleague since such use complies with company policy and international calls on the user's personal SIM/mobile phone plan are comparatively expensive (e.g., outside the scope of the user's calling plan). The system can also selectively disable mobile telephony and data functions, except perhaps for some calls/messages to/from certain contacts, during emergencies, etc., when it is determined that a device is roaming on a visited network and the user does not wish to bear the costs associated with the use of the visited network.

The personalization system can use the presence or absence of other people when extracting user interaction patterns. Data that indicates the proximity of other devices to the user's device can be included in the telemetry data and used when generating the user interaction pattern dataset 615 (FIG. 6) used to personalize a given device and user experiences. For example, the personalization system can determine that a user typically uses particular applications on a device when alone, but the pattern of interaction is different when a spouse's device is nearby (i.e., within some predetermined distance threshold), or that friends have different behaviors when in a larger group compared to that when in a smaller group or alone.

In other illustrative examples, the user's interaction with applications on a device can be correlated to contextual data describing the device's location and/or movement. When the device is being used in a car and motion is detected through a sensor such as a GPS (Global Positioning System) component or accelerometer, the user interaction pattern with applications on the device can be extracted and analyzed. When motion is detected in future instances, the system could determine that the user is driving in the car again. The start and lock screens can be personalized in that case to show a map application or launch the digital assistant to read turn by turn directions aloud using an internal speaker or an audio endpoint device such as a wired or wireless headset, earpiece, etc.

Figure 13:
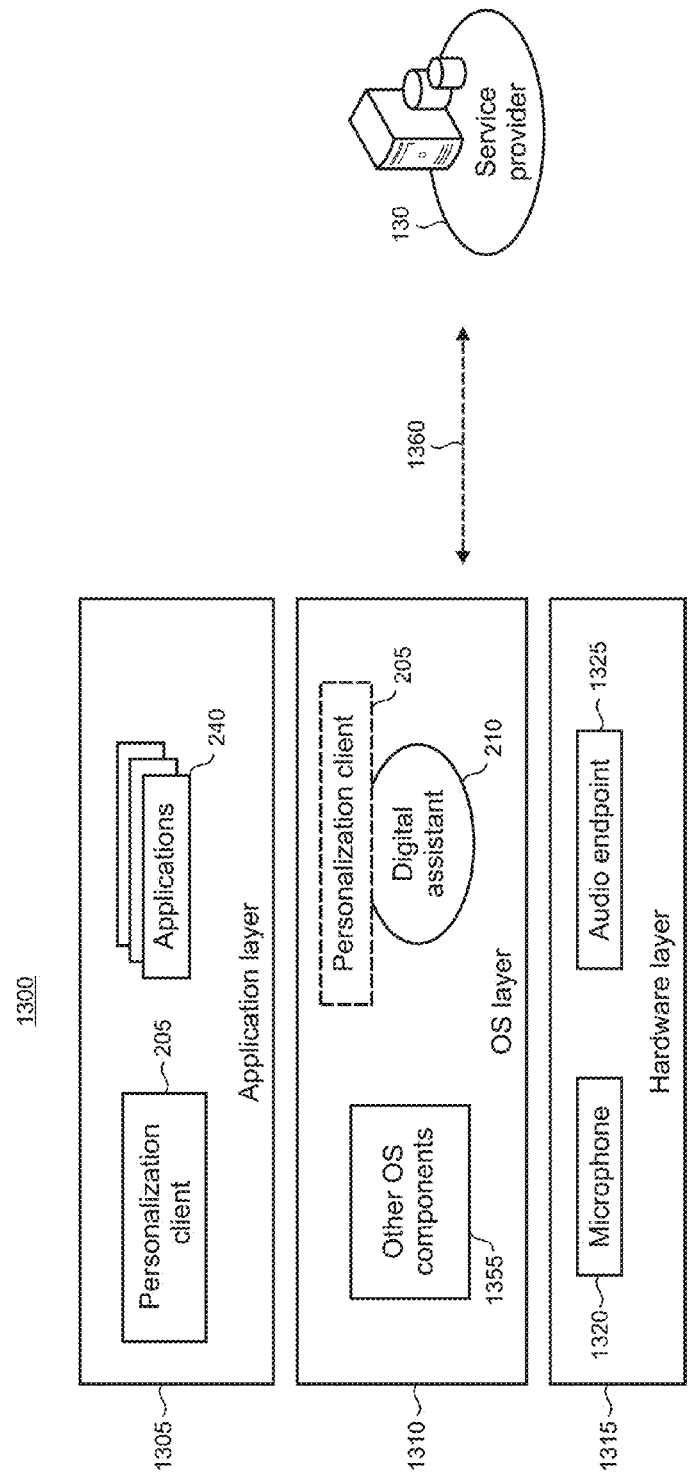
FIG. 13 shows an illustrative layered architecture that includes a digital assistant component and a personalization client.

Additional implementation details are now presented. FIG. 13 shows an illustrative layered architecture 1300 that may be instantiated on a given device 110. The architecture 1300 is typically implemented in software, although combinations of software, firmware, and/or hardware may also be utilized in some cases. The architecture 1300 is arranged in layers and includes an application layer 1305, an OS (operating system) layer 1310, and a hardware layer 1315. The hardware layer 1315 provides an abstraction of the various hardware used by the device 110 (e.g., input and output devices, networking and radio hardware, etc.) to the layers above it. In this illustrative example, the hardware layers support a microphone 1320 and an audio endpoint 1325 which may include, for example, the device's internal speaker, a wired or wireless headset/earpiece, external speaker/device, and the like.

The application layer 1305 in this illustrative example supports various applications 240 (e.g., web browser, map application, email application, news application, etc.), as well as the personalization client 205. The applications are often implemented using locally executing code. However in some cases, these applications may rely on services and/or remote code execution provided by remote servers or other computing platforms such as those supported by the service provider 130 or other cloud-based resources. While the personalization client 205 is shown here as a component that is instantiated in the application layer 1305, it will be appreciated that the functionality provided by a given application may be implemented, in whole or part, using components that are supported in either the OS or hardware layers.

The OS layer 1310 supports the digital assistant 210 and various other OS components 1355. In typical implementations, the digital assistant 210 can interact with the service provider 130, as indicated by line 1360. That is, the digital assistant 210 in some implementations can partially utilize or fully utilize remote code execution supported at the service provider 130, or using other remote resources. In addition, it may utilize and/or interact with the other OS components 1355 (and/or other components that are instantiated in the other layers of the architecture 1300) as may be needed to implement the various features and functions described herein. In some implementations, some or all of the functionalities supported by the personalization client 205 can be incorporated into the digital assistant as shown by the dashed rectangle in FIG. 13.

Figure 14:
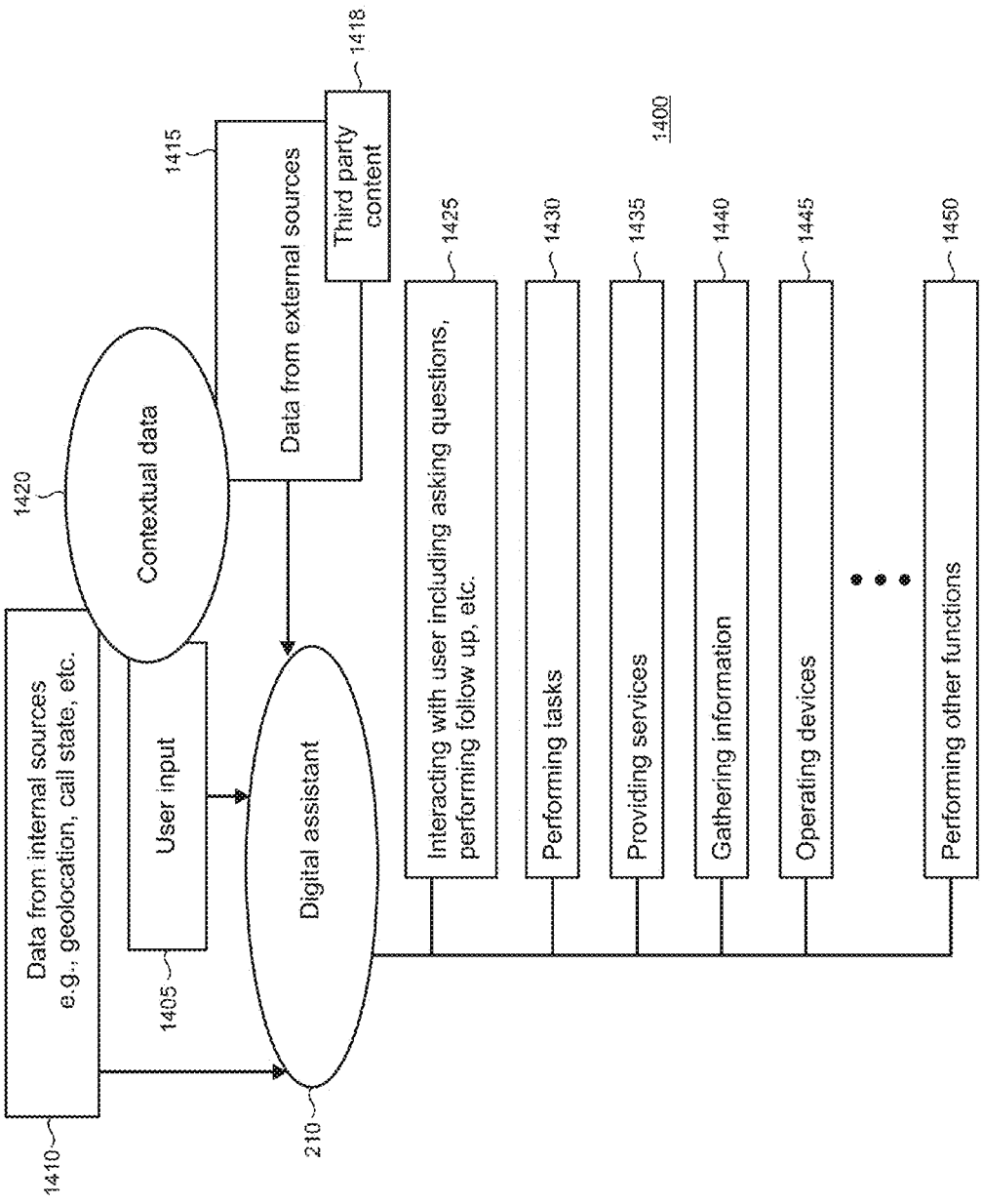
FIG. 14 shows illustrative inputs to a digital assistant and an illustrative taxonomy of general functions that may be performed by a digital assistant.

FIG. 14 shows an illustrative taxonomy of functions 1400 that may typically be supported by the digital assistant 210 either natively or in combination with an application 240. Inputs to the digital assistant 210 typically can include user input 1405, data from internal sources 1410, and data from external sources 1415 which can include third-party content 1418. For example, data from internal sources 1410 could include the current location of the device 110 that is reported by a GPS component on the device, or some other location-aware component. The externally sourced data 1415 includes data provided, for example, by external systems, databases, services, and the like such as the service provider 130 (FIG. 1). The various inputs can be used alone or in various combinations to enable the digital assistant 210 to utilize contextual data 1420 when it operates. Examples of contextual data were previously provided in the text above accompanying FIG. 12.

As shown, the functions 1400 illustratively include interacting with the user 1425 (through a voice recognition system, natural language UI and other UIs, for example); performing tasks 1430 (e.g., making note of appointments in the user's calendar, sending messages and emails, etc.); providing services 1435 (e.g., answering questions from the user, mapping directions to a destination, setting alarms, forwarding notifications, reading emails, news, blogs, etc.); gathering information 1440 (e.g., finding information requested by the user about a book or movie, locating the nearest Italian restaurant, etc.); operating devices 1445 (e.g., setting preferences, adjusting screen brightness, turning wireless connections such as Wi-Fi and Bluetooth on and off, communicating with other devices, controlling smart appliances, etc.); and performing various other functions 1450. The list of functions 1400 is not intended to be exhaustive and other functions may be provided by the digital assistant 210 and/or applications 240 as may be needed for a particular implementation of user interaction pattern extraction for device personalization.

Figure 15:
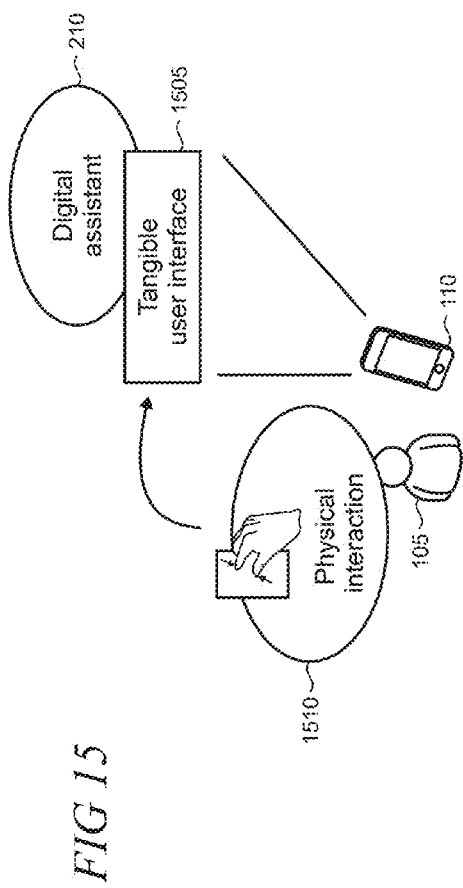
FIGS. 15, 16, and 17 show illustrative interfaces between a user and a digital assistant.

A user can typically interact with the digital assistant 210 in a number of ways depending on the features and functionalities supported by a given device 110. For example, as shown in FIG. 15, the digital assistant 210 may expose a tangible user interface 1505 that enables the user 105 to employ physical interactions 1510 in support of the experiences, features, and functions on the device 110. Such physical interactions can include manipulation of physical and/or virtual controls such as buttons, menus, keyboards, etc., using touch-based inputs like tapping, flicking, dragging, etc. on a touch screen, and the like.

Figure 16:
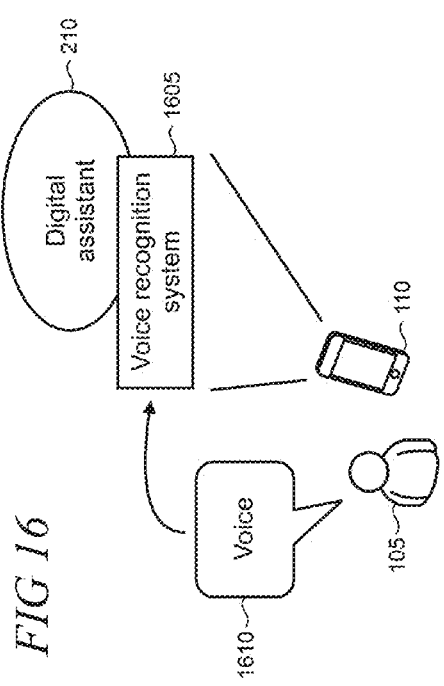

As shown in FIG. 16, the digital assistant 210 can employ a voice recognition system 1605 having a UI that can take voice inputs 1610 from the user 105. The voice inputs 1610 can be used to invoke various actions, features, and functions on a device 110, provide inputs to the systems and applications, and the like. In some cases, the voice inputs 1610 can be utilized on their own in support of a particular user experience while in other cases the voice input can be utilized in combination with other non-voice inputs or inputs such as those implementing physical controls on the device or virtual controls implemented on a UI or those using gestures (as described below).

Figure 17:
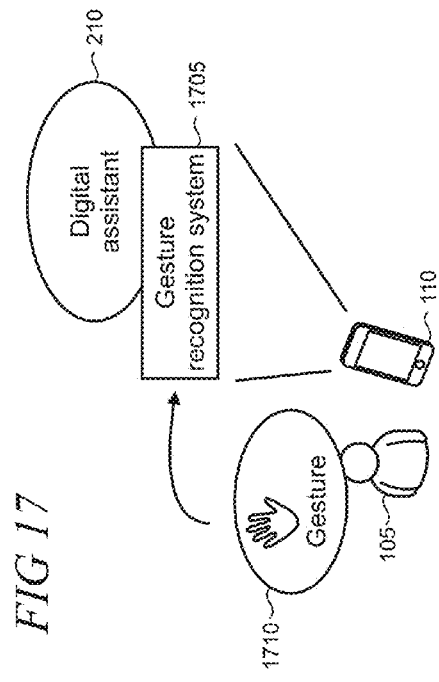

The digital assistant 210 can also employ a gesture recognition system 1705 having a UI as shown in FIG. 17. Here, the system 1705 can sense gestures 1710 performed by the user 105 as inputs to invoke various actions, features, and functions on a device 110, provide inputs to the systems and applications, and the like. The user gestures 1710 can be sensed using various techniques such as optical sensing, touch sensing, proximity sensing, and the like. In some cases, various combinations of voice commands, gestures, and physical manipulation of real or virtual controls can be utilized to interact with the digital assistant. In some scenarios, the digital assistant can be automatically invoked and/or be adapted to operate responsively to biometric data or environmental data.

Accordingly, as the digital assistant typically maintains awareness of device state and other context, it may be invoked or controlled by specific context such as user input, received notifications, or detected events associated with biometric or environmental data. For example, the digital assistant can behave in particular ways and surface appropriate user experiences when biometric and environmental data indicates that the user is active and moving around outdoors as compared to occasions when the user is sitting quietly inside. If the user seems stressed or harried, the digital assistant might suggest music selections that are relaxing and calming. When data indicates that the user has fallen asleep for a nap, the digital assistant can mute device audio, set a wakeup alarm, and indicate the user's online status as busy.

Figure 18:
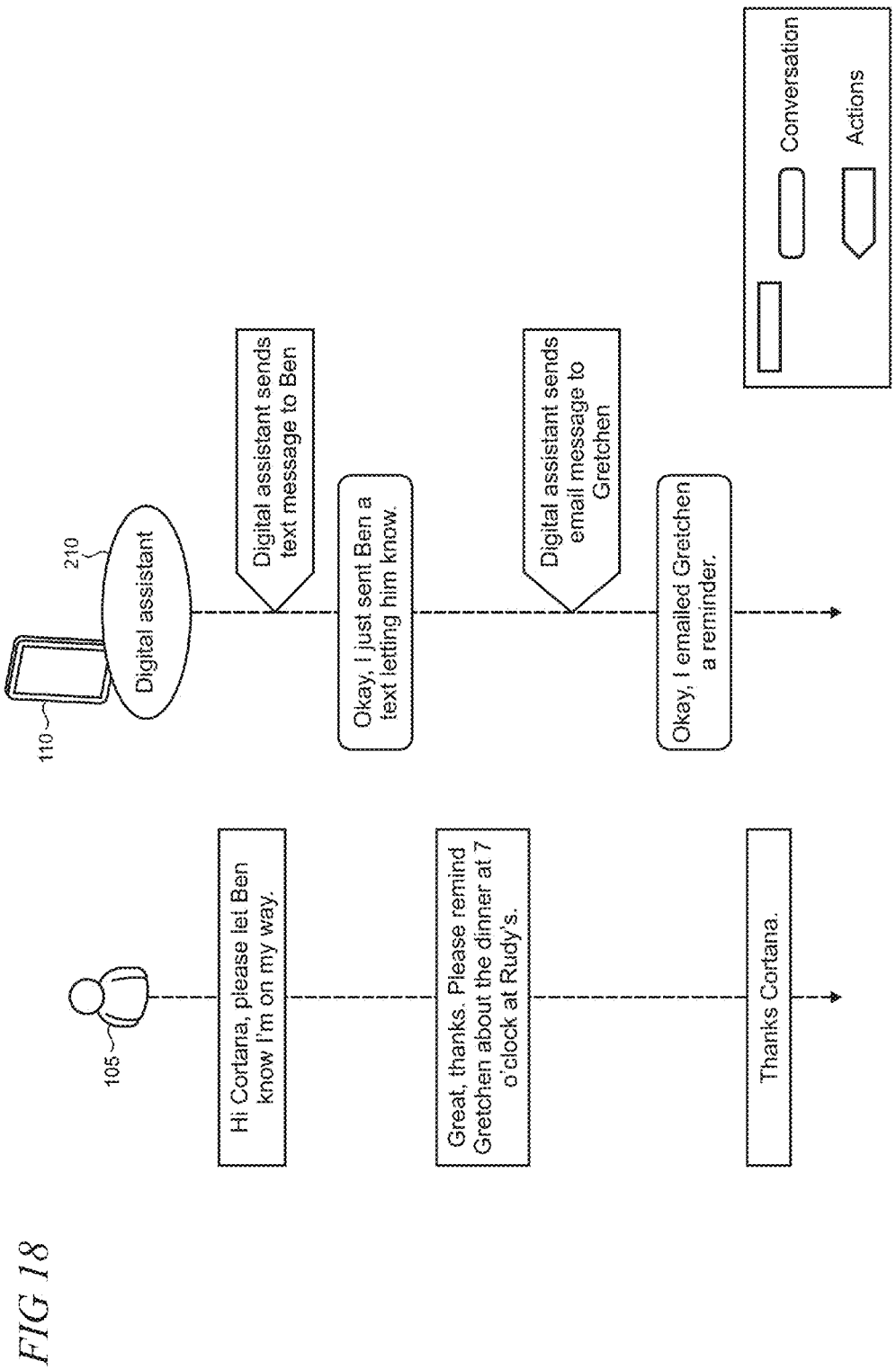
FIG. 18 depicts an illustrative use scenario involving a user and a digital assistant.

FIG. 18 depicts an illustrative use scenario involving a user 105 and a digital assistant 210 operating on a device 110 in the context of the present user interaction pattern extraction for device personalization. In this particular example, the user refers to the digital assistant by its name "Cortana." When the user asks the digital assistant to send a message to her friend, the digital assistant knows—for example, from previous interactions as expressed in the user interaction pattern dataset and available context—that the user typically communicates with this particular friend using text messaging around this time of day. With this information, the digital assistant sends out a text message to the friend with the desired message in response to the user's request. The digital assistant speaks to the user using an audio UI to confirm the actions it is taking Later in the conversation, when the user asks for a message to be sent to another friend, the digital assistant knows, using the dataset and context, to communicate with that person using an email. In some cases, the digital assistant can make a suggestion to the user as to a course of action to be taken and wait for confirmation from the user before taking the action.

Figure 19:
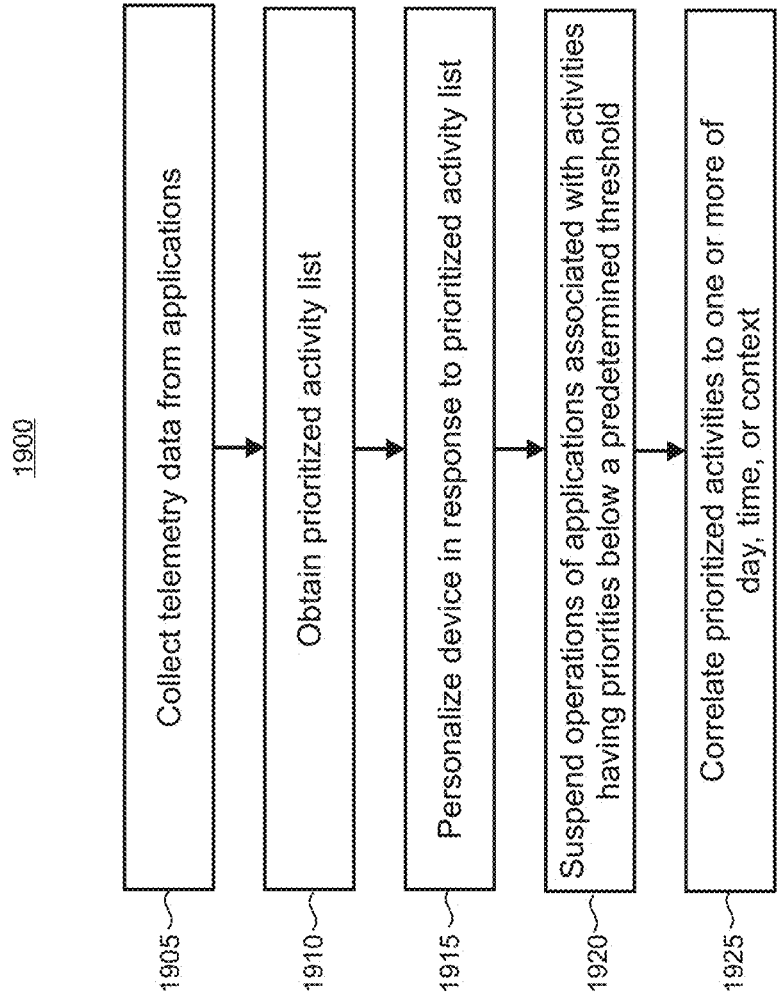
FIGS. 19, 20, and 21 show illustrative methods that may be performed when implementing the present user interaction pattern extraction for device personalization.

FIG. 19 shows a flowchart of an illustrative method 1900 that may be performed on a device. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1905, telemetry data is collected from one or more applications, using for example instrumentation that is instantiated in the applications. In step 1910, a prioritized activity list is obtained. Updated lists can be obtained periodically in some cases. The list is generated by a pattern recognition methodology to extract user interaction patterns from the telemetry data. In step 1915, the device is personalized in response to the prioritized activity list. In step 1920, operations are suspended for an application associated with activities having priorities that are below a predetermined threshold. In step 1925, prioritized activities are correlated to one or more of day, time, or context (context examples were provided above in the text accompanying FIG. 12).

Figure 20:
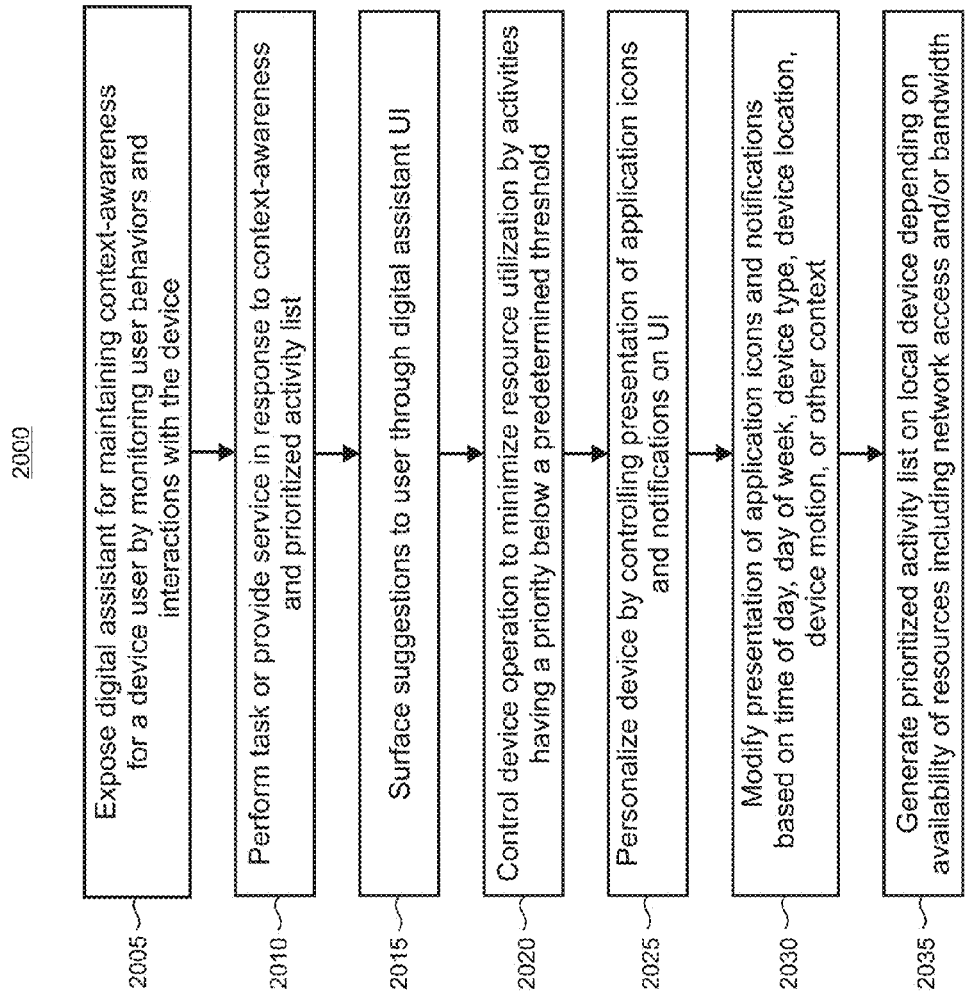

FIG. 20 is a flowchart of an illustrative method 2000 for operating a digital assistant on a device. In step 2005, a digital assistant is exposed for maintaining context-awareness for a device user by monitoring user behaviors and interactions with the device. In step 2010, tasks are performed or services are provided using the context-awareness and in response to a prioritized activity list that is generated from the monitored user interactions and behaviors. In step 2015, suggestions for possible actions and services are surfaced to the user through the digital assistant UI. In step 2020, operations on the device are controlled to minimize resource utilization by activities having a priority that are below a predetermined threshold.

In step 2025, the device is personalized by controlling presentation of application icons and notifications on the UI.

For example, the start and lock screens can be personalized as show in FIGS. 8, 9, 11, and 12 and described in the accompanying text. In step 2030, the presentation of application icons and notifications may be modified based on the time of day, day of week, device type, device location, device motion, or other context. In step 2035, the prioritized activity list can be generated locally on the device depending on the availability of resources including network access and/or bandwidth.

Figure 21:
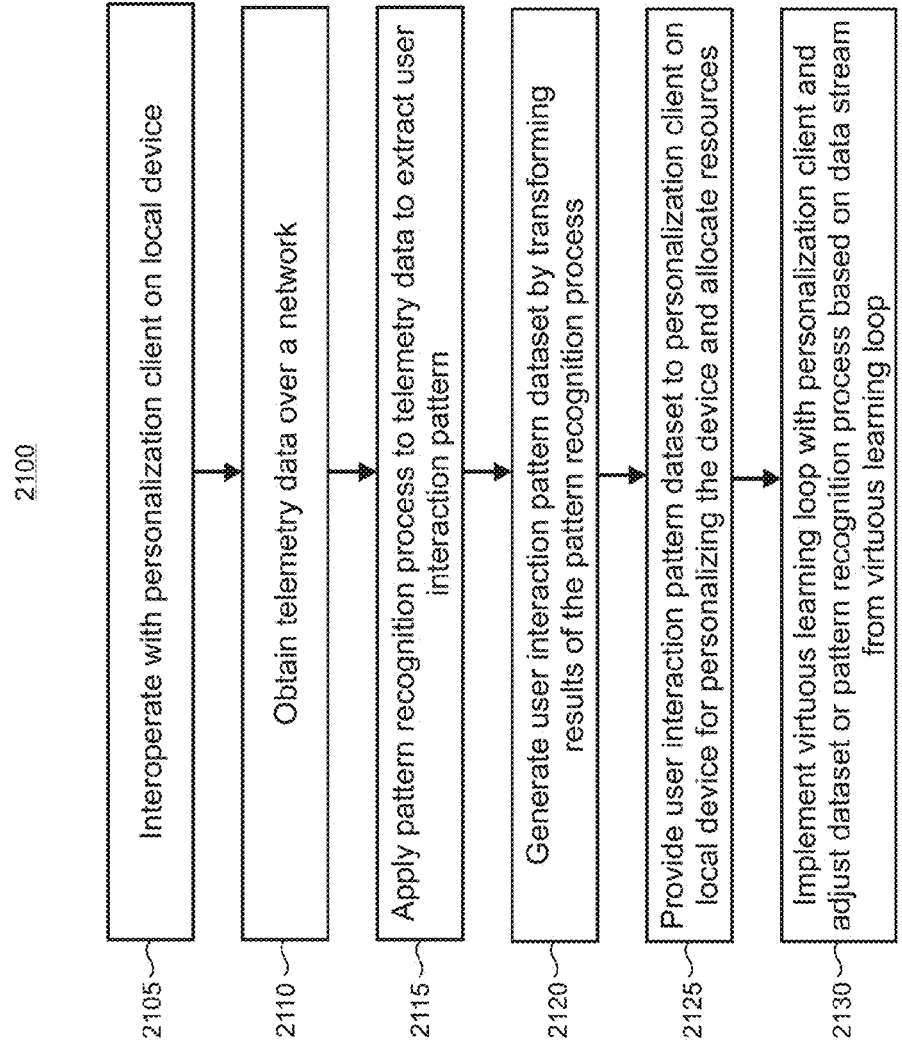

FIG. 21 shows an illustrative method 2100 that may be performed by a service provider (e.g., service provider 130 in FIG. 1). In step 2105, the service interoperates with the personalization client on the local device. In step 2110, telemetry data is obtained over a network. In step 2115, a pattern recognition process is applied to the telemetry data to extract a user interaction pattern. In step 2120, a user interaction pattern dataset is generated by transforming results of the pattern recognition process.

In step 2125, a user interaction pattern dataset is provided to the personalization client on the local device for personalizing the device and allocating resources. In step 2130, a virtuous learning loop is implemented with the personalization client and the dataset and/or the pattern recognition process adjusted based on a data stream from the loop. For example, the virtuous learning loop can facilitate machine learning in some cases. New and/or modified pattern recognition algorithms can also be introduced into the personalization system as appropriate.

Figure 22:
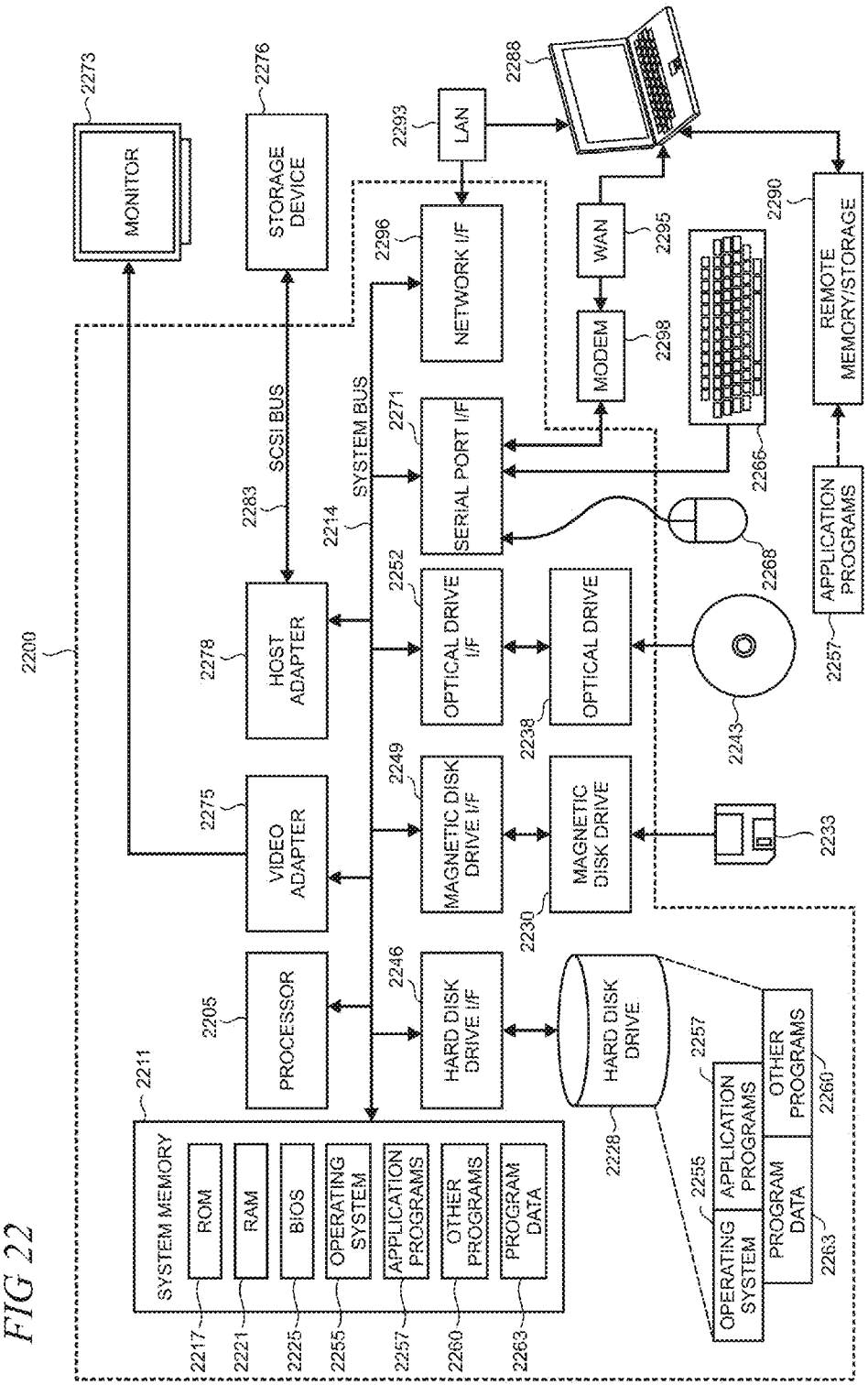
FIG. 22 is a simplified block diagram of an illustrative computer system such as a personal computer (PC) that may be used in part to implement the present user interaction pattern extraction for device personalization.

FIG. 22 is a simplified block diagram of an illustrative computer system 2200 such as a PC, client machine, or server with which the present user interaction pattern extraction for device personalization may be implemented. Computer system 2200 includes a processor 2205, a system memory 2211, and a system bus 2214 that couples various system components including the system memory 2211 to the processor 2205. The system bus 2214 may be any of several types of bus structures including a memory bus or memory controller, a peripheral bus, or a local bus using any of a variety of bus architectures. The system memory 2211 includes read only memory (ROM) 2217 and random access memory (RAM) 2221. A basic input/output system (BIOS) 2225, containing the basic routines that help to transfer information between elements within the computer system 2200, such as during startup, is stored in ROM 2217. The computer system 2200 may further include a hard disk drive 2228 for reading from and writing to an internally disposed hard disk (not shown), a magnetic disk drive 2230 for reading from or writing to a removable magnetic disk 2233 (e.g., a floppy disk), and an optical disk drive 2238 for reading from or writing to a removable optical disk 2243 such as a CD (compact disc), DVD (digital versatile disc), or other optical media. The hard disk drive 2228, magnetic disk drive 2230, and optical disk drive 2238 are connected to the system bus 2214 by a hard disk drive interface 2246, a magnetic disk drive interface 2249, and an optical drive interface 2252, respectively. The drives and their associated computer-readable storage media provide non-volatile storage of computer-readable instructions, data structures, program modules, and other data for the computer system 2200. Although this illustrative example includes a hard disk, a removable magnetic disk 2233, and a removable optical disk 2243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present user interaction pattern extraction for device personalization. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2233, optical disk 2243, ROM 2217, or RAM 2221, including an operating system 2255, one or more application programs 2257, other program modules 2260, and program data 2263. A user may enter commands and information into the computer system 2200 through input devices such as a keyboard 2266 and pointing device 2268 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2205 through a serial port interface 2271 that is coupled to the system bus 2214, but may be connected by other interfaces, such as a parallel port, game port, or universal serial bus (USB). A monitor 2273 or other type of display device is also connected to the system bus 2214 via an interface, such as a video adapter 2275. In addition to the monitor 2273, personal computers typically include other peripheral output devices (not shown), such as speakers and printers. The illustrative example shown in FIG. 22 also includes a host adapter 2278, a Small Computer System Interface (SCSI) bus 2283, and an external storage device 2276 connected to the SCSI bus 2283.

The computer system 2200 is operable in a networked environment using logical connections to one or more remote computers, such as a remote computer 2288. The remote computer 2288 may be selected as another personal computer, a server, a router, a network PC, a peer device, or other common network node, and typically includes many or all of the elements described above relative to the computer system 2200, although only a single representative remote memory/storage device 2290 is shown in FIG. 22. The logical connections depicted in FIG. 22 include a local area network (LAN) 2293 and a wide area network (WAN) 2295. Such networking environments are often deployed, for example, in offices, enterprise-wide computer networks, intranets, and the Internet.

When used in a LAN networking environment, the computer system 2200 is connected to the local area network 2293 through a network interface or adapter 2296. When used in a WAN networking environment, the computer system 2200 typically includes a broadband modem 2298, network gateway, or other means for establishing communications over the wide area network 2295, such as the Internet. The broadband modem 2298, which may be internal or external, is connected to the system bus 2214 via a serial port interface 2271. In a networked environment, program modules related to the computer system 2200, or portions thereof, may be stored in the remote memory storage device 2290. It is noted that the network connections shown in FIG. 22 are illustrative and other means of establishing a communications link between the computers may be used depending on the specific requirements of an application of the present user interaction pattern extraction for device personalization.

Figure 23:
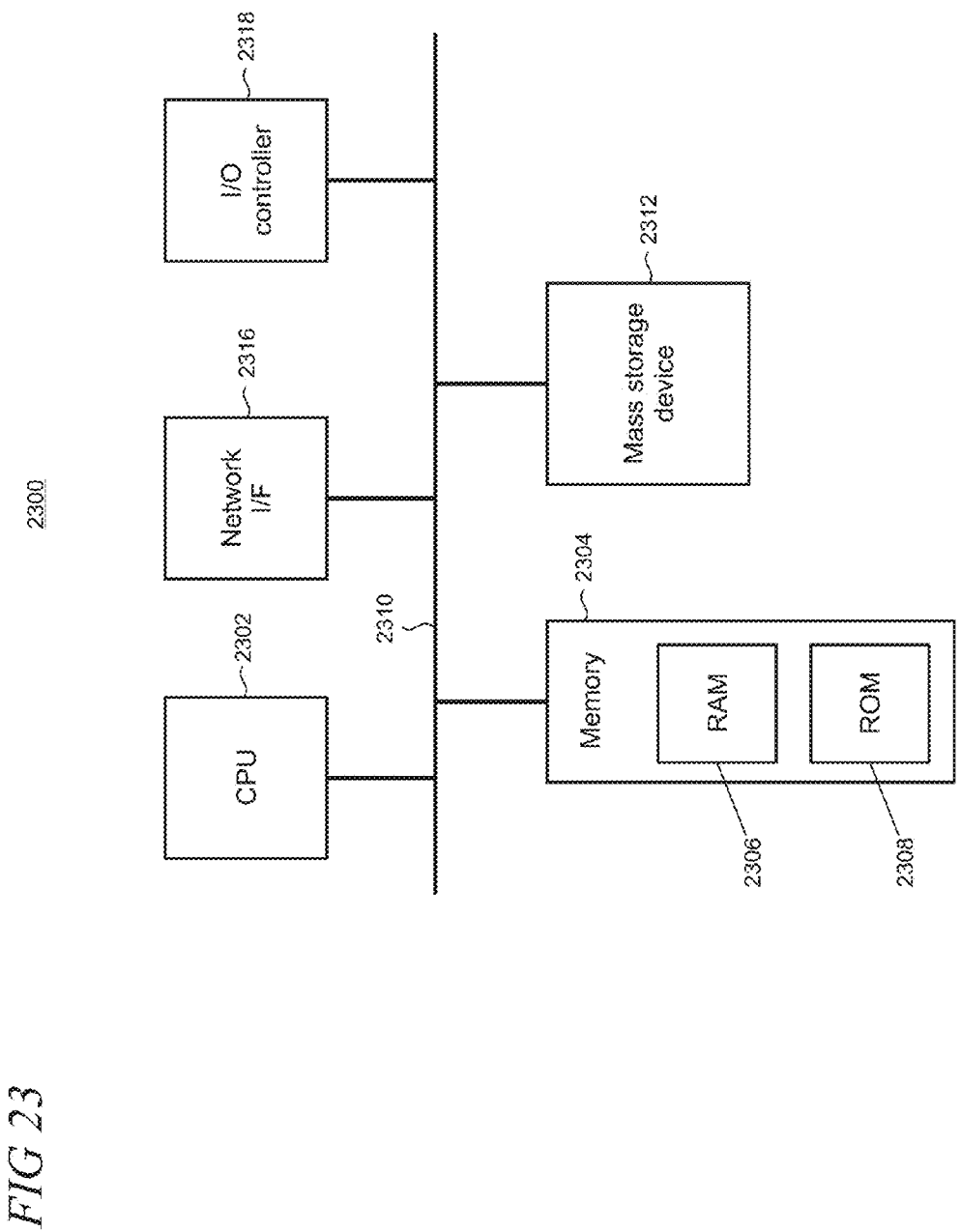
FIG. 23 shows a block diagram of an illustrative device that may be used in part to implement the present user interaction pattern extraction for device personalization.

FIG. 23 shows an illustrative architecture 2300 for a device capable of executing the various components described herein for providing the present user interaction pattern extraction for device personalization. Thus, the architecture 2300 illustrated in FIG. 23 shows an architecture that may be adapted for a server computer, mobile phone, a PDA, a smartphone, a desktop computer, a netbook computer, a tablet computer, GPS device, gaming console, and/or a laptop computer. The architecture 2300 may be utilized to execute any aspect of the components presented herein.

The architecture 2300 illustrated in FIG. 23 includes a CPU (Central Processing Unit) 2302, a system memory 2304, including a RAM 2306 and a ROM 2308, and a system bus 2310 that couples the memory 2304 to the CPU 2302. A basic input/output system containing the basic routines that help to transfer information between elements within the architecture 2300, such as during startup, is stored in the ROM 2308. The architecture 2300 further includes a mass storage device 2312 for storing software code or other computer-executed code that is utilized to implement applications, the file system, and the operating system.

The mass storage device 2312 is connected to the CPU 2302 through a mass storage controller (not shown) connected to the bus 2310. The mass storage device 2312 and its associated computer-readable storage media provide non-volatile storage for the architecture 2300.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It should be appreciated that the network interface unit 2316 also may be utilized to connect to other types of networks and remote computer systems. The architecture 2300 also may include an input/output controller 2318 for receiving and processing input from a number of other devices, including a keyboard, mouse, or electronic stylus (not shown in FIG. 23). Similarly, the input/output controller 2318 may provide output to a display screen, a printer, or other type of output device (also not shown in FIG. 23).

It should be appreciated that the software components described herein may, when loaded into the CPU 2302 and executed, transform the CPU 2302 and the overall architecture 2300 from a general-purpose computing system into a special-purpose computing system customized to facilitate the functionality presented herein. The CPU 2302 may be constructed from any number of transistors or other discrete circuit elements, which may individually or collectively assume any number of states. More specifically, the CPU 2302 may operate as a finite-state machine, in response to executable instructions contained within the software modules disclosed herein. These computer-executable instructions may transform the CPU 2302 by specifying how the CPU 2302 transitions between states, thereby transforming the transistors or other discrete hardware elements constituting the CPU 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2300 in order to store and execute the software components presented herein. It also should be appreciated that the architecture 2300 may include other types of computing devices, including handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
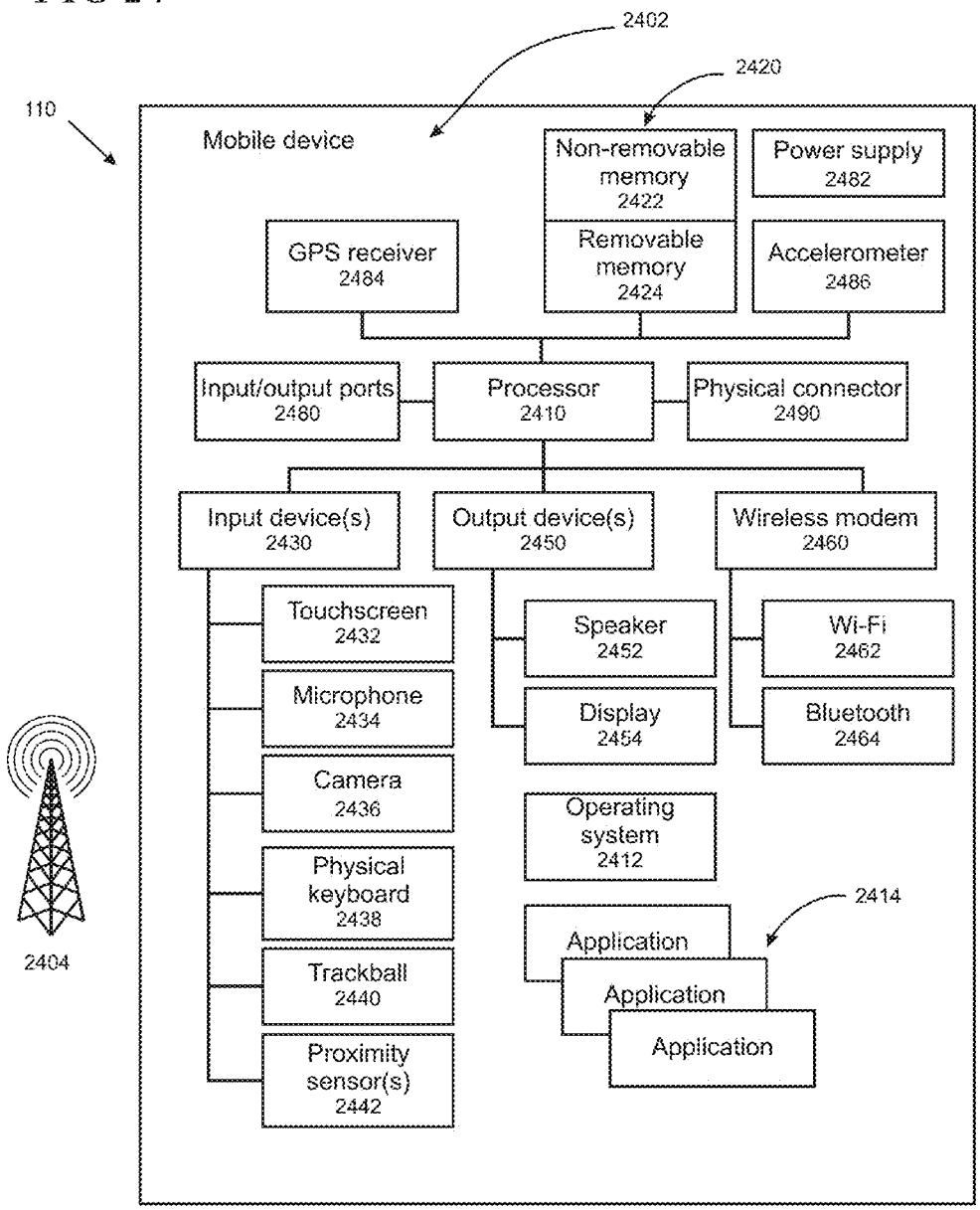
FIG. 24 is a block diagram of an illustrative mobile device.

FIG. 24 is a functional block diagram of an illustrative device 110 such as a mobile phone or smartphone including a variety of optional hardware and software components, shown generally at 2402. Any component 2402 in the mobile device can communicate with any other component, although, for ease of illustration, not all connections are shown. The mobile device can be any of a variety of computing devices (e.g., cell phone, smartphone, handheld computer, PDA, etc.) or be incorporated into other devices or systems (e.g., appliances, automobiles, etc.) and can allow wireless two-way communications with one or more mobile communication networks 2404, such as a cellular or satellite network.

The illustrated device 110 can include a controller or processor 2410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2412 can control the allocation and usage of the components 2402, including power states, above-lock states, and below-lock states, data-saving states, and provides support for one or more application programs 2414. The application programs can include common mobile computing applications (e.g., image-capture applications, email applications, calendars, contact managers, web browsers, messaging applications), or any other computing application.

The illustrated device 110 can include memory 2420. Memory 2420 can include non-removable memory 2422 and/or removable memory 2424. The non-removable memory 2422 can include RAM, ROM, Flash memory, a hard disk, or other well-known memory storage technologies. The removable memory 2424 can include Flash memory or a Subscriber Identity Module (SIM) card, which is well known in GSM (Global System for Mobile communications) systems, or other well-known memory storage technologies, such as "smart cards." The memory 2420 can be used for storing data and/or code for running the operating system 2412 and the application programs 2414. Example data can include web pages, text, images, sound files, video data, or other data sets to be sent to and/or received from one or more network servers or other devices via one or more wired or wireless networks.

The memory 2420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 2420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 2430; such as a touch screen 2432; microphone 2434 for implementation of voice input for voice recognition, voice commands and the like; camera 2436; physical keyboard 2438; trackball 2440; and/or proximity sensor 2442; and one or more output devices 2450, such as a speaker 2452 and one or more displays 2454. Other input devices (not shown) using gesture recognition may also be utilized in some cases. Other possible output devices (not shown) can include piezoelectric or haptic output devices. Some devices can serve more than one input/output function. For example, touchscreen 2432 and display 2454 can be combined into a single input/output device.

A wireless modem 2460 can be coupled to an antenna (not shown) and can support two-way communications between the processor 2410 and external devices, as is well understood in the art. The modem 2460 is shown generically and can include a cellular modem for communicating with the mobile communication network 2404 and/or other radio-based modems (e.g., Bluetooth 2464 or Wi-Fi 2462). The wireless modem 2460 is typically configured for communication with one or more cellular networks, such as a GSM network for data and voice communications within a single cellular network, between cellular networks, or between the device and a public switched telephone network (PSTN).

The device can further include at least one input/output port 2480, a power supply 2482, a satellite navigation system receiver 2484, such as a GPS receiver, an accelerometer 2486, a gyroscope (not shown), and/or a physical connector 2490, which can be a USB port, IEEE 1394 (FireWire) port, and/or an RS-232 port. The illustrated components 2402 are not required or all-inclusive, as any components can be deleted and other components can be added.

Figure 25:
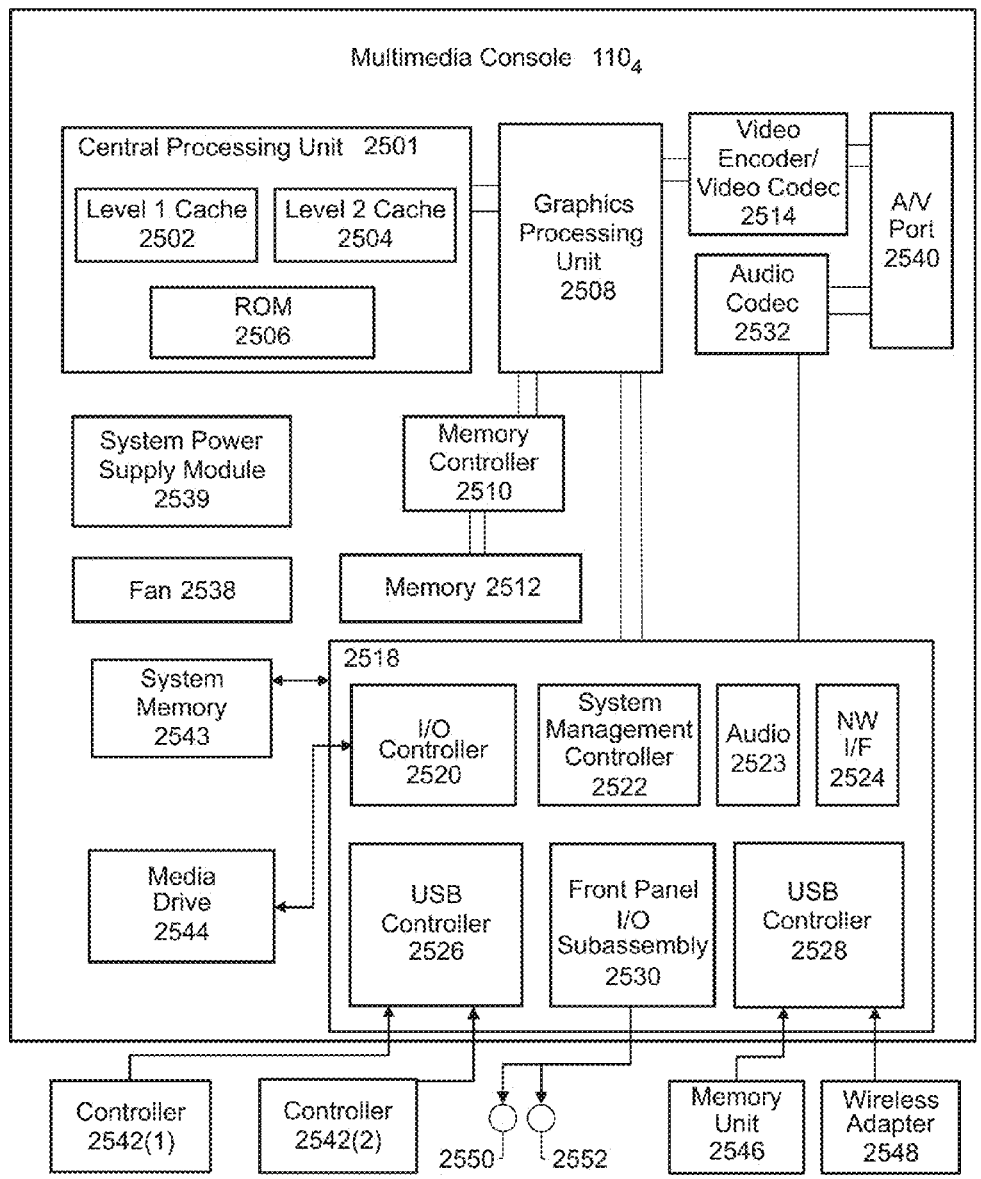
FIG. 25 is a block diagram of an illustrative multimedia console.

FIG. 25 is an illustrative functional block diagram of a multimedia console $110_4$. The multimedia console $110_4$ has a central processing unit (CPU) 2501 having a level 1 cache 2502, a level 2 cache 2504, and a Flash ROM (Read Only Memory) 2506. The level 1 cache 2502 and the level 2 cache 2504 temporarily store data and hence reduce the number of memory access cycles, thereby improving processing speed and throughput. The CPU 2501 may be configured with more than one core, and thus, additional level 1 and level 2 caches 2502 and 2504. The Flash ROM 2506 may store executable code that is loaded during an initial phase of a boot process when the multimedia console $110_4$ is powered ON.

A graphics processing unit (GPU) 2508 and a video encoder/video codec (coder/decoder) 2514 form a video processing pipeline for high speed and high resolution graphics processing. Data is carried from the GPU 2508 to the video encoder/video codec 2514 via a bus. The video processing pipeline outputs data to an A/V (audio/video) port 2540 for transmission to a television or other display. A memory controller 2510 is connected to the GPU 2508 to facilitate processor access to various types of memory 2512, such as, but not limited to, a RAM.

The multimedia console $110_4$ includes an I/O controller 2520, a system management controller 2522, an audio processing unit 2523, a network interface controller 2524, a first USB (Universal Serial Bus) host controller 2526, a second USB controller 2528, and a front panel I/O subassembly 2530 that are preferably implemented on a module 2518. The USB controllers 2526 and 2528 serve as hosts for peripheral controllers 2542(1) and 2542(2), a wireless adapter 2548, and an external memory device 2546 (e.g., Flash memory, external CD/DVD ROM drive, removable media, etc.). The network interface controller 2524 and/or wireless adapter 2548 provide access to a network (e.g., the Internet, home network, etc.) and may be any of a wide variety of various wired or wireless adapter components including an Ethernet card, a modem, a Bluetooth module, a cable modem, or the like.

System memory 2543 is provided to store application data that is loaded during the boot process. A media drive 2544 is provided and may comprise a DVD/CD drive, hard drive, or other removable media drive, etc. The media drive 2544 may be internal or external to the multimedia console $110_4$. Application data may be accessed via the media drive 2544 for execution, playback, etc. by the multimedia console $110_4$. The media drive 2544 is connected to the I/O controller 2520 via a bus, such as a Serial ATA bus or other high speed connection (e.g., IEEE 1394).

The system management controller 2522 provides a variety of service functions related to assuring availability of the multimedia console $110_4$. The audio processing unit 2523 and an audio codec 2532 form a corresponding audio processing pipeline with high fidelity and stereo processing. Audio data is carried between the audio processing unit 2523 and the audio codec 2532 via a communication link. The audio processing pipeline outputs data to the A/V port 2540 for reproduction by an external audio player or device having audio capabilities.

The front panel I/O subassembly 2530 supports the functionality of the power button 2550 and the eject button 2552, as well as any LEDs (light emitting diodes) or other indicators exposed on the outer surface of the multimedia console $110_4$. A system power supply module 2539 provides power to the components of the multimedia console $110_4$. A fan 2538 cools the circuitry within the multimedia console $110_4$.

The CPU 2501, GPU 2508, memory controller 2510, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 2543 into memory 2512 and/or caches 2502 and 2504 and executed on the CPU 2501. The application may present a graphical user interface that provides a consistent user experience when navigating to different media types available on the multimedia console $110_4$. In operation, applications and/or other media contained within the media drive 2544 may be launched or played from the media drive 2544 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 2524 or the wireless adapter 2548, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2542(1) and 2542(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present user interaction pattern extraction for device personalization are now presented by way of illustration and not as an exhaustive list of all embodiments. An example includes a device, comprising: one or more processors; a user interface (UI) for interacting with a user of the device; and a memory device storing code associated with one or more applications and computer-readable instructions which, when executed by the one or more processors, perform a method comprising the steps of: collecting telemetry data from the one or more applications, the telemetry data at least describing user interactions with the one or more applications, obtaining a prioritized list of activities that are associated with the one or more applications, the prioritized list being generated by application of a pattern recognition methodology to extract user interaction patterns from the telemetry data, personalizing the device responsively to a prioritized list of activities, and suspending operations of an application associated with activities in the list having a priority below a predetermined threshold.

In another example, the device further includes personalization by composing and rendering a screen on the UI, the screen using user-controllable objects that are emphasized on the UI responsively to the prioritized list, the objects functioning at least as launch controls for the one or more applications. In another example, the device further includes personalization by composing and rendering a lock screen on the UI, the lock screen showing content or notifications responsively to the prioritized list. In another example, the device further includes operating a digital assistant on the device responsively to the prioritized list, the digital assistant operation including rendering user experiences on the UI, the UI being adapted for user interaction using audio. In another example, the device further includes configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource, the digital assistant further being configured to implement the performing using one or more machine-learning techniques applied to the telemetry data. In another example, the prioritized list is correlated to day and time and the device further includes personalization in response to the correlation to day and time. In another example, the prioritized list is correlated to contextual data further including personalizing the device in response to the correlation to contextual data. In another example, the contextual data comprises one or more of time/date, location of the user or device, language, schedule, applications installed on the device, user preferences, user behaviors, user activities, stored contacts, call history, messaging history, browsing history, device type, device capabilities, or communication network type. In another example, the device further includes obtaining the prioritized list of activities from a remote service. In another example, the telemetry data describes one or more of device, product, application, activity, activity state, activity duration, date, or time.

A further example includes a method of operating a digital assistant on a device having a user interface (UI) supporting graphics and audio and supporting applications, the method comprising: exposing the digital assistant on the device for maintaining context-awareness for a device user by collecting telemetry data through monitoring user behaviors and interactions with the device and applications, the digital assistant further interacting with the device user using voice interactions through the UI; using the context-awareness, performing a task or providing a service in response to a prioritized activity list that is generated from the monitored user behaviors and interactions; and controlling operation of the device to manage resource utilization by activities having a priority below a predetermined threshold.

In another example, the monitoring uses instrumentation instantiated in one of application, operating system, or digital assistant and the context-awareness includes identifying one-off or non-recurring events associated with the monitored user behaviors and interactions. In another example, the performing includes providing a suggestion through the UI for a method of communicating with user of other devices. In another example, the method further includes, in response to a prioritized activity list that is generated from the monitored user behaviors and interactions and using the context-awareness, personalizing the device to the user so that i) applications associated with relatively higher priority activities are emphasized on the UI compared with applications associated with relatively lower priority activities, the application emphasis being implemented using one of configuring a size of application icons or configuring a display order for the application icons, and ii) notifications associated with higher priority applications are emphasized on the UI compared with notifications associated with relatively lower priority, the notifications emphasis being implemented by configuring a display order for the notification icons. In another example, the method further includes changing the application emphasis or notification emphasis based on time of day, device type, device location, or other context. In another example, the method further includes generating the prioritized activity list locally on the device according to availability of device resources including network bandwidth.

A further example includes one or more computer-readable memory devices storing instructions which, when executed by one or more processors disposed in a computer server, perform a method comprising the steps of: interoperating with a personalization client on a local device, the personalization client exposing an application programming interface (API) to one or more applications being executable on the device to collect telemetry data from instrumentation disposed in the one or more applications, the telemetry data describing interactions between a device user and the one or more applications; obtaining the telemetry data over a network; applying a pattern recognition process to the telemetry data to extract user interaction patterns; generating a user interaction pattern dataset by transforming results of the pattern recognition process; and providing the user interaction pattern dataset to the personalization client on the local device, the local device using the user interaction pattern dataset to personalize the device for the user and allocate resources on the device.

In another example, the one or more computer-readable memory devices further include implementing a virtuous learning loop with the personalization client and iteratively generating or adjusting the user interaction pattern dataset or pattern recognition process based on a data stream received from the virtuous learning loop. In another example, the one or more computer-readable memory devices further include configuring the pattern recognition process to utilize one of a clustering algorithm or naïve Bayes classifier. In another example, the personalization includes displaying application icons or notifications according to a priority established by the user interaction pattern dataset.

Based on the foregoing, it should be appreciated that technologies for user interaction pattern extraction for device personalization have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A device, comprising:
   one or more processors;
   a user interface (UI) for interacting with a user of the device; and
   a memory device storing code associated with one or more applications and computer-readable instructions which, when executed by the one or more processors, perform a method comprising the steps of:
   collecting telemetry data from the one or more applications, the telemetry data at least describing user interactions with the one or more applications,
   obtaining a prioritized list of activities that are associated with the one or more applications, the prioritized list being generated by application of a pattern recognition methodology to extract user interaction patterns from the telemetry data,
   personalizing the device responsively to a prioritized list of activities, and
   suspending operations of an application associated with activities in the list having a priority below a predetermined threshold.

2. The device of claim 1 further including personalizing the device by composing and rendering a screen on the UI, the screen using user-controllable objects that are emphasized on the UI responsively to the prioritized list, the objects functioning at least as launch controls for the one or more applications.

3. The device of claim 1 further including personalizing the device by composing and rendering a lock screen on the UI, the lock screen showing content or notifications responsively to the prioritized list.

4. The device of claim 1 further including operating a digital assistant on the device responsively to the prioritized list, the digital assistant operation including rendering user experiences on the UI, the UI being adapted for user interaction using audio.

5. The device of claim 4 further including configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource, the digital assistant further being configured to implement the performing using one or more machine-learning techniques applied to the telemetry data.

6. The device of claim 1 in which the prioritized list is correlated to day and time and further including personalizing the device in response to the correlation to day and time.

7. The device of claim 1 in which the prioritized list is correlated to contextual data further including personalizing the device in response to the correlation to contextual data.

8. The device of claim 7 in which the contextual data comprises one or more of time/date, location of the user or device, language, schedule, applications installed on the device, user preferences, user behaviors, user activities, stored contacts, call history, messaging history, browsing history, device type, device capabilities, or communication network type.

9. The device of claim 1 further including obtaining the prioritized list of activities from a remote service.

10. The device of claim 1 in which the telemetry data describes one or more of device, product, application, activity, activity state, activity duration, date, or time.

11. A method of operating a digital assistant on a device having a user interface (UI) supporting graphics and audio and supporting applications, the method comprising:
    exposing the digital assistant on the device for maintaining context-awareness for a device user by collecting telemetry data through monitoring user behaviors and interactions with the device and applications, the digital assistant further interacting with the device user using voice interactions through the UI;
    using the context-awareness, performing a task or providing a service in response to a prioritized activity list that is generated from the monitored user behaviors and interactions; and
    controlling operation of the device to manage resource utilization by activities having a priority below a predetermined threshold.

12. The method of claim 11 in which the monitoring uses instrumentation instantiated in one of application, operating system, or digital assistant and the context-awareness includes identifying one-off or non-recurring events associated with the monitored user behaviors and interactions.

13. The method of claim 11 in which the performing includes providing a suggestion through the UI for a method of communicating with user of other devices.

14. The method of claim 11 further including, in response to a prioritized activity list that is generated from the monitored user behaviors and interactions and using the context-awareness, personalizing the device to the user so that
    i) applications associated with relatively higher priority activities are emphasized on the UI compared with applications associated with relatively lower priority activities, the application emphasis being implemented using one of configuring a size of application icons or configuring a display order for the application icons, and
    ii) notifications associated with higher priority applications are emphasized on the UI compared with notifications associated with relatively lower priority, the notifications emphasis being implemented by configuring a display order for the notification icons.

15. The method of claim 14 further including changing the application emphasis or notification emphasis based on time of day, device type, device location, or other context.

16. The method of claim 11 further including generating the prioritized activity list locally on the device according to availability of device resources including network bandwidth.

17. One or more computer-readable memory devices storing instructions which, when executed by one or more processors disposed in a computer server, perform a method comprising the steps of:
    interoperating with a personalization client on a local device, the personalization client exposing an application programming interface (API) to one or more applications being executable on the device to collect telemetry data from instrumentation disposed in the one or more applications, the telemetry data describing interactions between a device user and the one or more applications;
    obtaining the telemetry data over a network;
    applying a pattern recognition process to the telemetry data to extract user interaction patterns;
    generating a user interaction pattern dataset by transforming results of the pattern recognition process; and
    providing the user interaction pattern dataset to the personalization client on the local device, the local device using the user interaction pattern dataset to personalize the device for the user and allocate resources on the device.

18. The one or more computer-readable memory devices of claim 17 further including implementing a virtuous learning loop with the personalization client and iteratively generating or adjusting the user interaction pattern dataset or pattern recognition process based on a data stream received from the virtuous learning loop.

19. The one or more computer-readable memory devices of claim 17 further including configuring the pattern recognition process to utilize one of a clustering algorithm or naïve Bayes classifier.

20. The one or more computer-readable memory devices of claim 17 in which the personalization includes displaying application icons or notifications according to a priority established by the user interaction pattern dataset.

* * * * *